(12) United States Patent
Eshima

(10) Patent No.: US 11,019,362 B2
(45) Date of Patent: May 25, 2021

(54) INFORMATION PROCESSING DEVICE AND METHOD

(71) Applicant: SONY CORPORATION, Tokyo (JP)

(72) Inventor: Masashi Eshima, Chiba (JP)

(73) Assignee: SONY CORPORATION, Tokyo (JP)

( * ) Notice: Subject to any disclaimer, the term of this patent is extended or adjusted under 35 U.S.C. 154(b) by 31 days.

(21) Appl. No.: 16/463,266

(22) PCT Filed: Dec. 14, 2017

(86) PCT No.: PCT/JP2017/044858
§ 371 (c)(1),
(2) Date: May 22, 2019

(87) PCT Pub. No.: WO2018/123611
PCT Pub. Date: Jul. 5, 2018

(65) Prior Publication Data
US 2019/0313121 A1  Oct. 10, 2019

(30) Foreign Application Priority Data

Dec. 28, 2016 (JP) .............................. JP2016-256729

(51) Int. Cl.
*H04N 19/597* (2014.01)
*H04N 19/136* (2014.01)
*H04N 13/282* (2018.01)

(52) U.S. Cl.
CPC ......... *H04N 19/597* (2014.11); *H04N 13/282* (2018.05); *H04N 19/136* (2014.11)

(58) Field of Classification Search
CPC ........ G06T 7/50; H04N 19/46; H04N 19/167; H04N 19/597; H04N 13/282;
(Continued)

(56) References Cited

U.S. PATENT DOCUMENTS 9,117,138 B2 *  8/2015  Li ...................... G06K 9/00375
9,984,498 B2 *  5/2018  Loop .................... G06T 15/005
(Continued)

FOREIGN PATENT DOCUMENTS

CN         102450011 A     5/2012
EP           2417770 A1    2/2012
(Continued)

OTHER PUBLICATIONS

Tehrani, et al., "Integration of 3D audio and 3D video for FTV", 3DTV Conference: The True Vision—Capture, Transmission and Display of 3D Video, May 4-6, 2009, pp. 1-4.
(Continued)

*Primary Examiner* — Boubacar Abdou Tchoussou
(74) *Attorney, Agent, or Firm* — Chip Law Group

(57) ABSTRACT

Provided are an information processing device and an information processing method that enable suppression of a reduction in coding efficiency while suppressing a reduction in subjective quality. Information regarding a three-dimensional region is encoded on the basis of a distribution related to overlapping of visual fields of the three-dimensional region to be imaged by a plurality of imaging units, the distribution being specified by using a parameter relating to overlapping of visual fields that are imaging ranges of the plurality of imaging units.

19 Claims, 15 Drawing Sheets

(58) Field of Classification Search
CPC .. H04N 19/136; H04N 19/115; H04N 19/103; H04N 19/169
See application file for complete search history.

(56) References Cited

U.S. PATENT DOCUMENTS

| | | |
|---|---|---|
| 2010/0259595 A1 | 10/2010 | Trimeche et al. |
| 2014/0064602 A1* | 3/2014 | Li ........................ G06K 9/4604 382/154 |
| 2014/0111611 A1 | 4/2014 | Lecroart |
| 2015/0022521 A1* | 1/2015 | Loop ....................... G06T 17/00 345/424 |
| 2017/0018056 A1* | 1/2017 | Holzer ............... G06K 9/00664 |

FOREIGN PATENT DOCUMENTS

| | | |
|---|---|---|
| EP | 2536142 A1 | 12/2012 |
| JP | 2014-520409 A | 8/2014 |
| JP | 2015-114716 A | 6/2015 |
| WO | 2007/026440 A1 | 3/2007 |
| WO | 2010/116243 A1 | 10/2010 |
| WO | 2012/172894 A1 | 12/2012 |

OTHER PUBLICATIONS

Dorea, et al., "Attention-Weighted Texture and Depth Bit-Allocation in General-Geometry Free-Viewpoint Television", IEEE Transactions on Circuits and Systems for Video Technology, vol. 27, Issue 5, May 2017, pp. 1-12.

International Search Report and Written Opinion of PCT Application No. PCT/JP2017/044858, dated Feb. 20, 2018, 10 pages of ISRWO.

Masayuki Tanimoto, "Free-Viewpoint TV", IEEE International Conference on Image Processing, Sep. 2010, pp. 2393-2396.

* cited by examiner

INFORMATION PROCESSING DEVICE AND METHOD

CROSS REFERENCE TO RELATED APPLICATIONS

This application is a U.S. National Phase of International Patent Application No. PCT/JP2017/044858 filed on Dec. 14, 2017, which claims priority benefit of Japanese Patent Application No. JP 2016-256729 filed in the Japan Patent Office on Dec. 28, 2016. Each of the above-referenced applications is hereby incorporated herein by reference in its entirety.

TECHNICAL FIELD

The present disclosure relates to an information processing device and an information processing method, and more particularly, to an information processing device and an information processing method enabled to suppress a reduction in coding efficiency while suppressing a reduction in subjective quality.

BACKGROUND ART

In recent years, to display an image (also referred to as a free viewpoint image) of a three-dimensional region viewed from an arbitrary viewpoint position, a method has been devised for imaging the three-dimensional region by a plurality of imaging devices from respective viewpoint positions different from each other, and generating the free viewpoint image from captured images by those imaging devices (see, for example, Patent Document 1).

In such a conventional method, the amount of information has been reduced by encoding captured images independently of each other; however, when a wider range is imaged and recorded by a larger number of imaging devices for a longer period of time, there has been a possibility that the amount of data accordingly increases and it becomes difficult to record and transmit the data. To cope with this, it is possible to suppress the reduction in coding efficiency by increasing the compression ratio of each captured image.

CITATION LIST

Patent Document

Patent Document 1: Japanese Patent Application Laid-Open No. 2015-114716

SUMMARY OF THE INVENTION

Problems to be Solved by the Invention

However, in general, such a three-dimensional region includes a portion with a relatively high degree of interest and a portion with a relatively low degree of interest, and when such a tendency is ignored and the compression ratio of each captured image is uniformly increased, quality of the portion with the relatively high degree of interest (in other words, a portion relatively likely to be included in the free viewpoint image) is degraded similarly to the portion with the relatively low degree of interest (in other words, a portion relatively less likely to be included in the free viewpoint image), so that there has been a possibility that quality (also referred to as subjective quality) of the free viewpoint image for the user viewing the free viewpoint image is unnecessarily reduced.

The present disclosure has been made in view of such a situation, and it is intended to suppress a reduction in coding efficiency while suppressing a reduction in subjective quality.

Solutions to Problems

An information processing device of an aspect of the present technology is an information processing device including an encoding unit that encodes information regarding a three-dimensional region on the basis of a distribution related to overlapping of visual fields of the three-dimensional region to be imaged by a plurality of imaging units, the distribution being specified by using a parameter relating to overlapping of visual fields that are imaging ranges of the plurality of imaging units.

The encoding unit can further include a weighting unit that performs weighting of the three-dimensional region by using the parameter.

The weighting unit can individually perform weighting of a voxel that is a unit region of a predetermined size.

The weighting unit can set a larger weight for a voxel including a subject.

A subject determination unit can be further included that determines whether or not a subject is included, for each voxel, on the basis of the parameter, in which the weighting unit is configured to set a larger weight for a voxel determined by the subject determination unit that the subject is included, than for a voxel determined by the subject determination unit that the subject is not included.

The subject determination unit can detect a peak voxel in which the parameter is larger than a first threshold value, detect and hold a voxel in which the parameter is larger than a second threshold value smaller than the first threshold value in a periphery of the peak voxel detected, and determine that the peak voxel and the voxel in the periphery held include the subject.

The weighting unit can set a smaller weight for an unviewable voxel in the three-dimensional region.

The weighting unit can set a smaller weight for the unviewable voxel specified on the basis of a viewable region map indicating a distribution of a viewable region in the three-dimensional region.

A parameter calculating unit can be further included that calculates the parameter for each voxel, in which the weighting unit is configured to perform weighting of the three-dimensional region by using the parameter calculated by the parameter calculating unit.

The parameter calculating unit can calculate the parameter for each voxel on the basis of a position, a direction, a size, and a shape of a visual field cone indicating the imaging range of each of the imaging units.

The parameter calculating unit can calculate the parameter further on the basis of a position in the visual field cone of each voxel.

The parameter calculating unit can estimate the visual field cone on the basis of a position and an orientation of each of the imaging units.

The parameter calculating unit can estimate the visual field cone further on the basis of an internal parameter of each of the imaging units.

The parameter calculating unit can estimate the visual field cone further on the basis of depth information.

A weight video associating unit can be further included that associates a distribution of a weight in the three-dimensional region obtained by the weighting unit with a captured image of the three-dimensional region, in which the encoding unit is configured to encode the captured image on the basis of the distribution of the weight in the three-dimensional region associated with the captured image by the weight video associating unit.

The encoding unit can control a bit rate or a coding mode of encoding of the captured image depending on the distribution of the weight in the three-dimensional region.

A weight audio associating unit can be further included that associates a distribution of a weight in the three-dimensional region obtained by the weighting unit with audio in the three-dimensional region, in which the encoding unit is configured to encode the audio on the basis of the distribution of the weight in the three-dimensional region associated with the audio by the weight audio associating unit.

The encoding unit can control a bit rate or a coding mode of encoding of the audio depending on the distribution of the weight in the three-dimensional region.

A weight three-dimensional structure associating unit can be further included that associates a distribution of a weight in the three-dimensional region obtained by the weighting unit with three-dimensional structure data indicating a three-dimensional structure of the three-dimensional region, in which the encoding unit is configured to encode the three-dimensional structure data on the basis of the distribution of the weight in the three-dimensional region associated with the three-dimensional structure data by the weight three-dimensional structure associating unit.

The encoding unit can control an approximation and a deletion rate of the number of vertices expressing three dimensions, of encoding of the three-dimensional structure data, depending on the distribution of the weight in the three-dimensional region.

An information processing method of an aspect of the present technology is an information processing method including encoding information regarding a three-dimensional region on the basis of a distribution related to overlapping of visual fields of the three-dimensional region to be imaged by a plurality of imaging units, the distribution being specified by using a parameter relating to overlapping of visual fields that are imaging ranges of the plurality of imaging units.

In the information processing device and the information processing method of the aspects of the present technology, the information regarding the three-dimensional region is encoded on the basis of the distribution related to overlapping of visual fields of the three-dimensional region to be imaged by the plurality of imaging units, the distribution being specified by using the parameter relating to overlapping of visual fields that are imaging ranges of the plurality of imaging units.

Effects of the Invention

According to the present disclosure, information can be processed. In particular, a reduction in coding efficiency can be suppressed while a reduction in subjective quality is suppressed.

MODE FOR CARRYING OUT THE INVENTION

The following is a description of a mode for carrying out the present disclosure (the mode will be hereinafter referred to as the embodiment). Note that, description will be made in the following order.
1. Encoding of captured image for free viewpoint image
2. First embodiment (imaging storage system)
3. Second embodiment (imaging storage system)
4. Third embodiment (imaging transmission system)
5. Fourth embodiment (computer)
6. Others 1. Encoding of Captured Image for Free Viewpoint Image In recent years, for example, like a method described in Patent document 1, to display an image (also referred to as a free viewpoint image) of a three-dimensional region viewed from an arbitrary viewpoint position, a method has been devised for imaging the three-dimensional region by a plurality of imaging devices from respective viewpoint positions different from each other, and generating the free viewpoint image from captured images by those imaging devices.

For example, a system including a plurality of imaging devices and an image processing device performs imaging in a plurality of directions by using the plurality of imaging devices, performs imaging while changing orientations (imaging directions) of the imaging devices, or performs imaging while moving positions (imaging positions) of the imaging devices, in a predetermined three-dimensional region, thereby obtaining a captured image group (image data group) of a large number of imaging directions and imaging positions. Then, the system generates an image (free viewpoint image) in an arbitrary viewpoint position and viewpoint direction in the three-dimensional region on the basis of the image data group by using the image processing device.

Figure 1B:
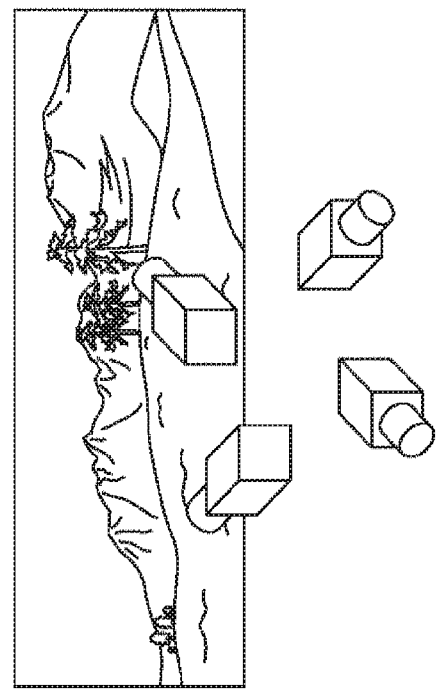
FIGS. 1A and 1B are diagrams illustrating an example of a state of imaging.
Figure 1A:
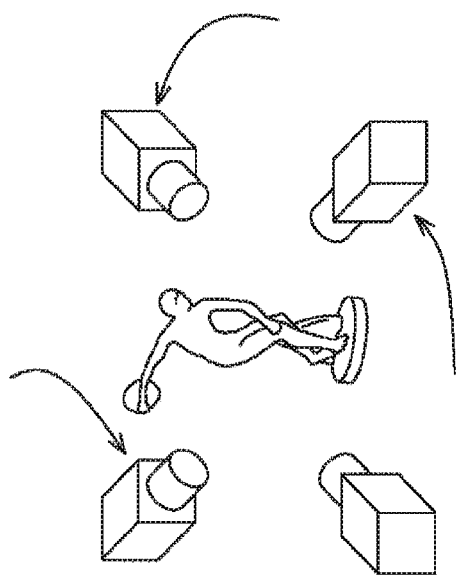

With such a system, a free viewpoint image can be provided in a wide range such as sightseeing spots, for example, historic sites and landscape areas. There may be cases of, for example, a subject case in which a viewer enjoys a free viewpoint image from various viewpoints on a predetermined subject such as a bronze statue as illustrated in FIG. 1A, an omnidirectional case in which a free viewpoint video is enjoyed in free directions 360° around the viewer from a predetermined position such as an observation deck as illustrated in FIG. 1B, and a case in which the subject case and the omnidirectional case are mixed. The imaging devices of such a system are not fixed but are moved in cooperation, whereby a wide range and long time free viewpoint video including these plural cases can be photographed by one system.

In such a system capable of imaging a wide range, data of enormous size is necessary to record the image, audio, and three-dimensional structure necessary for free viewpoint image generation, and there has been a possibility that a cost becomes very high of equipment for saving and transmitting the data. To cope with this, in a conventional method, the captured images are encoded independently of each other, whereby the amount of information has been reduced. However, in recent years, it has been required to image and record a wider range over a longer time with a larger number of imaging devices, and in that case, there has been a possibility that the amount of data increases and it becomes difficult to record and transmit the data.

To cope with this, it is possible to suppress the reduction in coding efficiency by increasing the compression ratio of each captured image. However, in general, such a three-dimensional region includes a portion with a relatively high degree of interest and a portion with a relatively low degree of interest, and when such a tendency is ignored and the compression ratio of each captured image is uniformly increased, quality of the portion with the relatively high degree of interest (in other words, a portion relatively likely to be included in the free viewpoint image) is degraded similarly to the portion with the relatively low degree of interest (in other words, a portion relatively less likely to be included in the free viewpoint image), so that there has been a possibility that quality (also referred to as subjective quality) of the free viewpoint image for the user viewing the free viewpoint image is unnecessarily reduced.

Furthermore, for example, in the computer graphics (CG) or the like, there exists a technology for controlling the quality of a three-dimensional structure (polygon or the like) depending on the distance from a player; however, in the case of the free viewpoint image described above, there is a possibility that a viewpoint at the time of imaging and a viewpoint at the time of viewing do not match each other. With such a control method, it has therefore been difficult to correctly control the quality depending on the degree of interest (importance) of the three-dimensional region. There has therefore been a possibility that the subjective quality of the free viewpoint image unnecessarily reduced.

Thus, the information regarding the three-dimensional region is encoded on the basis of the distribution related to overlapping of visual fields of the three-dimensional region to be imaged by the plurality of imaging units, the distribution being specified by using the parameter relating to overlapping of visual fields that are imaging ranges of the plurality of imaging units.

For example, in the information processing device, an encoding unit is included that encodes the information regarding the three-dimensional region on the basis of the distribution related to overlapping of visual fields of the three-dimensional region to be imaged by the plurality of imaging units, the distribution being specified by using the parameter relating to overlapping of visual fields that are imaging ranges of the plurality of imaging units.

By doing this, encoding can be performed with an appropriate method depending on the distribution of the importance of the three-dimensional region, so that a reduction in coding efficiency can be suppressed while a reduction in subjective quality is suppressed.

2. First Embodiment

Imaging Storage System

Figure 2:
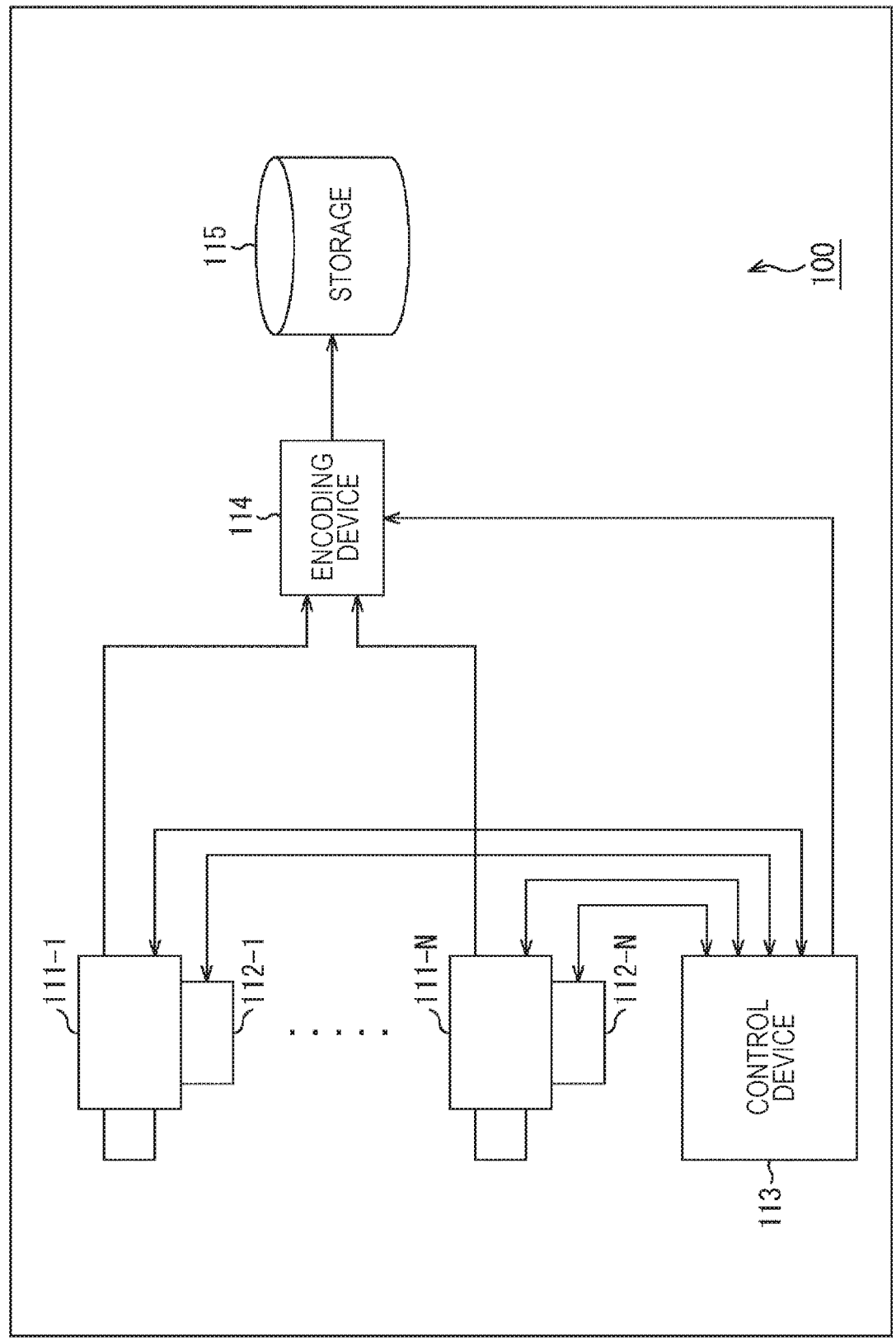
FIG. 2 is a diagram illustrating a main configuration example of an imaging storage system.

FIG. 2 is a block diagram illustrating a main configuration example of an imaging storage system that is an embodiment of an information processing system to which the present technology is applied. An imaging storage system 100 illustrated in FIG. 2 is a system that images a three-dimensional region to generate and store a captured image for free viewpoint image generation.

As illustrated in FIG. 2, the imaging storage system 100 includes imaging devices 111-1 to 111-N, orientation control devices 112-1 to 112-N, a control device 113, an encoding device 114, and a storage 115 (N is an arbitrary natural number). Hereinafter, in a case where it is not necessary to distinguish and describe the imaging devices 111-1 to 111-N from each other, each imaging device is also referred to as an imaging device 111. Furthermore, in a case where it is not necessary to distinguish and describe the orientation control devices 112-1 to 112-N from each other, each orientation control device is also referred to as an orientation control device 112.

The imaging device 111 has an imaging function, and images a subject to obtain a captured image. The position and orientation of the imaging device 111 are controlled by the orientation control device 112 corresponding to the imaging device 111. Furthermore, an imaging timing of the imaging device 111 and a setting related to imaging are controlled by the control device 113. The imaging device 111 supplies the captured image obtained by imaging to the encoding device 114.

The orientation control device 112 includes, for example, an arm, a rotary table, and the like, and controls the position and orientation of the imaging device 111 installed in the orientation control device 112 by driving. Note that, the orientation control device 112 is controlled by the control device 113.

The control device 113 performs processing relating to control of each imaging device 111 and each orientation control device 112. For example, the control device 113 causes the orientation control device 112 in which the imaging device 111 is installed to drive so that the imaging device 111 has a position and an orientation desired. Furthermore, for example, the control device 113 supplies a parameter relating to imaging to the imaging device 111, and causes the imaging device 111 to drive to perform imaging at a desired timing by using the parameter. Moreover, the control device 113 is configured to be able to acquire arbitrary information from the imaging device 111 and the orientation control device 112. For example, the control device 113 acquires information regarding the position and orientation of the imaging device 111 from the imaging device 111 and the orientation control device 112.

Moreover, the control device 113 is configured to be able to supply arbitrary information to the encoding device 114. For example, the control device 113 supplies information regarding the position and orientation of each imaging device 111 to the encoding device 114.

The encoding device 114 encodes the captured image supplied from each imaging device 111. At that time, the encoding device 114 dynamically controls saving quality of the video, audio, and three-dimensional structure according to a visual field overlap degree derived from a positional relationship between the imaging devices 111 or the like, a viewable region map set by a photographer, and the like. As a result, the encoding device 114 can compress a recording size while suppressing a reduction in quality. The encoding device 114 supplies generated coded data to the storage 115.

The storage 115 includes an arbitrary storage medium such as a hard disk or a semiconductor memory, and is configured to be able to store arbitrary information. The storage 115 stores the coded data supplied from the encoding device 114 in the storage medium.

Encoding Device

Figure 3:
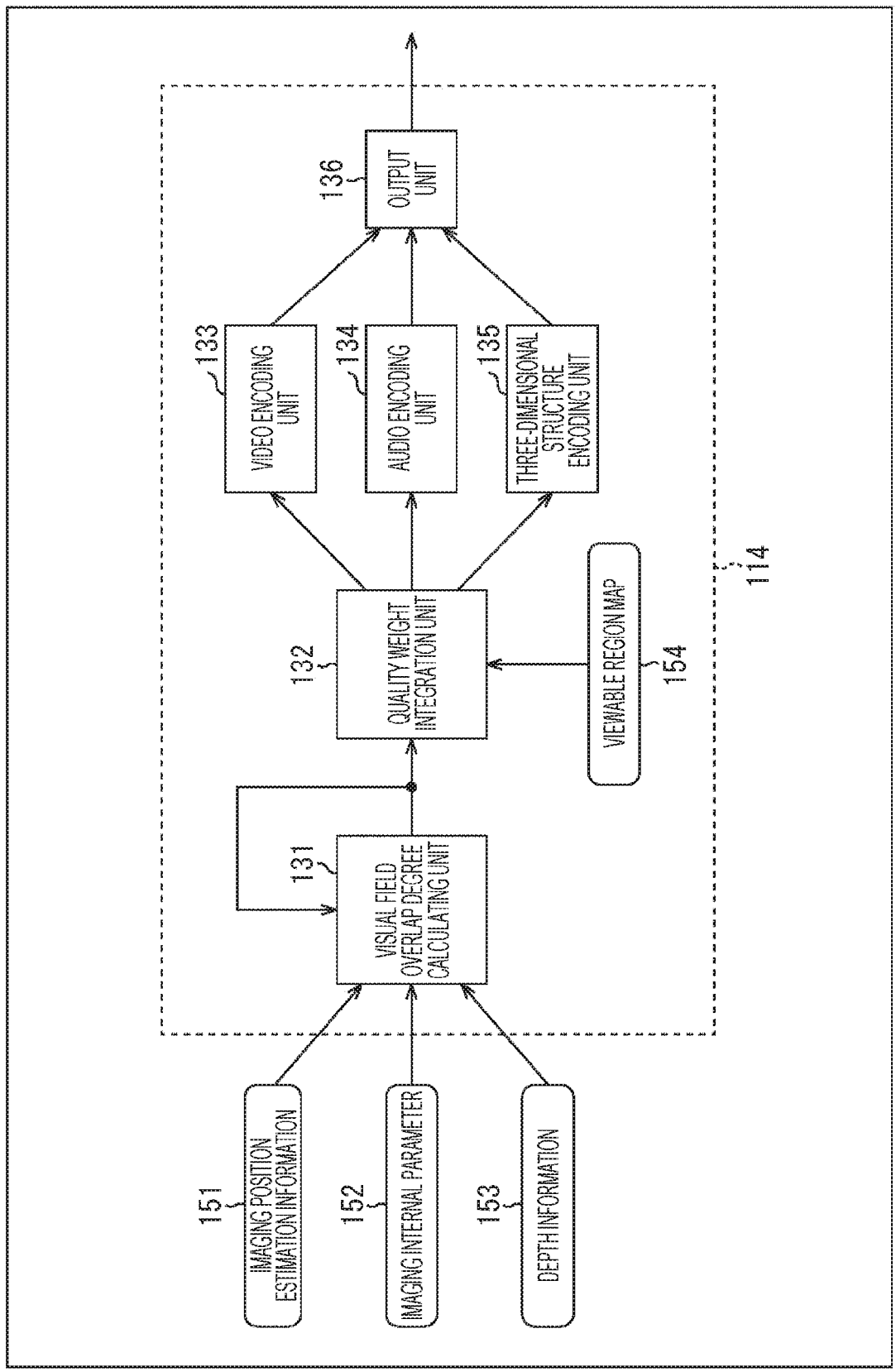
FIG. 3 is a block diagram illustrating a main configuration example of an encoding device.

FIG. 3 is a block diagram illustrating a main configuration example of the encoding device 114 (FIG. 2) that is an embodiment of the information processing device to which the present technology is applied. As illustrated in FIG. 3, the encoding device 114 includes a visual field overlap degree calculating unit 131, a quality weight integration unit 132, a video encoding unit 133, an audio encoding unit 134, a three-dimensional structure encoding unit 135, and an output unit 136.

The visual field overlap degree calculating unit 131 performs processing relating to calculation of a visual field overlap degree (also referred to as an overlap degree volume) that is a parameter relating to overlapping of visual fields that are imaging ranges of the imaging devices 111. Information regarding imaging, for example, imaging position estimation information 151, an imaging internal parameter 152, depth information, and the like is supplied to the visual field overlap degree calculating unit 131. The imaging position estimation information 151 is information indicating an imaging position, an imaging direction, and the like estimated of each imaging device 111. The imaging internal parameter 152 is information indicating an internal parameter of each imaging device 111 used at the time of imaging. Depth information 153 is information indicating a depth of the subject included in the captured image. By using these pieces of information, the visual field overlap degree calculating unit 131 obtains the visual field overlap degree and subject information that is information indicating a position of the subject. The visual field overlap degree calculating unit 131 supplies the information indicating the visual field overlap degree and the subject information to the quality weight integration unit 132.

On the basis of the information indicating the visual field overlap degree and the subject information supplied from the visual field overlap degree calculating unit 131, the viewable region map indicating a distribution of viewable region in the three-dimensional region, and the like, the quality weight integration unit 132 performs weighting concerning the quality on the three-dimensional region to be imaged by the imaging device 111, and sets a distribution of a quality weight (also referred to as a quality weight volume). Note that, the quality weight (quality weight volume) is a weight concerning the quality of the three-dimensional region to be imaged by the imaging device 111. The quality weight integration unit 132 associates the set distribution of the quality weight with various types of information such as the image, audio, three-dimensional structure, and supplies information indicating the distribution of the quality weight associated with the various types of information to the video encoding unit 133, the audio encoding unit 134, and the three-dimensional structure encoding unit 135.

The video encoding unit 133 encodes the image associated with the quality weight, by using a method based on the quality weight. The audio encoding unit 134 encodes the audio associated with the quality weight, by using the method based on the quality weight. Three-dimensional structure encoding unit 135 encodes three-dimensional structure data indicating the three-dimensional structure of the three-dimensional region, associated with the quality weight, by using a method based on the quality weight. That is, these encoding units encode information regarding the three-dimensional region with the method depending on the weight.

The output unit 136 outputs the coded data of the captured image generated by the video encoding unit 133. Furthermore, the output unit 136 outputs the coded data of the audio generated by the audio encoding unit 134. Moreover, the output unit 136 outputs the coded data of the three-dimensional structure generated by the three-dimensional structure encoding unit 135.

Visual Field Overlap Degree Calculating Unit

Figure 4:
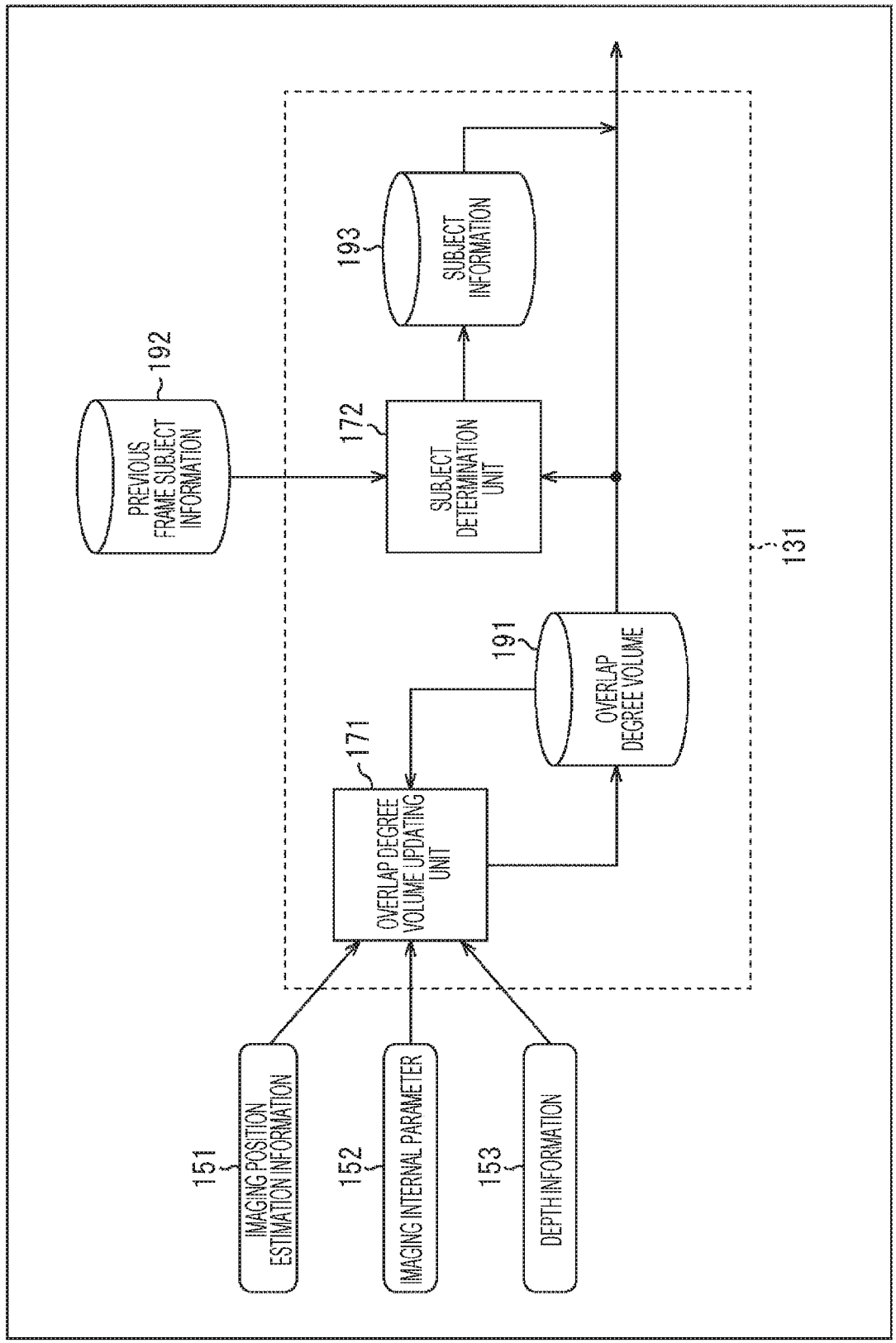
FIG. 4 is a block diagram illustrating a main configuration example of a visual field overlap degree calculating unit.

FIG. 4 is a block diagram illustrating a main configuration example of the visual field overlap degree calculating unit 131 of FIG. 3. As illustrated in FIG. 4, the visual field overlap degree calculating unit 131 includes an overlap degree volume updating unit 171 and a subject determination unit 172.

The overlap degree volume updating unit 171 updates an overlap degree volume 191 held, on the basis of the imaging position estimation information 151, the imaging internal parameter 152, and the depth information 153 supplied.

The imaging position estimation information 151 is generated in the control device 113, for example, and supplied from the control device 113 to the overlap degree volume updating unit 171. The imaging position estimation information 151 may be any information as long as it is information indicating the imaging position, imaging direction, and the like by each imaging device 111. For example, the imaging position estimation information 151 may be control information supplied by the control device 113 to the imaging device 111 or the orientation control device 112, or information generated on the basis of the control information. Note that, a method of expressing the position is arbitrary, and may be represented by, for example, xyz coordinates or the like, or may be represented by a voxel or the like as described later. Furthermore, a method of expressing the direction is arbitrary, and may be represented by, for example, xyz coordinates of a vector, or may be expressed by an angle from a reference direction, or the like.

The imaging internal parameter 152 may include any information. For example, the imaging internal parameter 152 may include information indicating a lens size of the imaging device 111, information indicating a calibration result of the imaging device 111, and the like. The imaging internal parameter 152 is generated in the control device 113 or each imaging device 111, for example, and supplied from the control device 113 or each imaging device 111 to the overlap degree volume updating unit 171.

The depth information 153 is the information indicating the depth of the subject included in the captured image obtained by the imaging device 111. The depth information 153 is generated on the basis of the captured image, for example, in the imaging device 111. The depth information 153 is generated in the imaging device 111, for example, and supplied from the imaging device 111 to the overlap degree volume updating unit 171. Note that, the depth information 153 may be omitted.

The overlap degree volume 191 is a three-dimensional volume expression that takes a larger value as it is a three-dimensional region photographed for a longer time by a larger number of cameras. The overlap degree volume 191 is set for each voxel that is a unit region of a predetermined size with respect to the three-dimensional region to be imaged by the imaging device 111.

The overlap degree volume updating unit 171 (also referred to as a parameter calculating unit. also referred to as a visual field overlap degree calculating unit. also referred to as an overlap degree volume calculating unit.) calculates the visual field overlap degree (the parameter relating to overlapping of visual fields, the overlap degree volume) on the basis of the imaging position estimation information 151 and the imaging internal parameter 152, and by using the calculated value, updates the overlap degree volume 191 held. At that time, the overlap degree volume updating unit 171 may update the overlap degree volume 191 of a voxel overlapping a view cone (visual field cone) indicating a range imaged by the imaging device 111 with a uniform value, or may update with a value corresponding to a position at which the voxel can be placed in the view cone. Generally, it can be said that the center of the screen and the vicinity of the focus point in the view cone are more important than others. Thus, by updating the overlap degree volume 191 with a value corresponding to the position at which the voxel can be placed in the view cone as described above, the overlap degree volume updating unit 171 can reflect the importance depending on such a position in the view cone on the overlap degree volume 191.

Furthermore, in a case where the depth information 153 can be used as attached information, the overlap degree volume updating unit 171 may update with a larger value a portion where the foreground found by the depth information 153 exists of the overlap degree volume 191 held. By doing this, more efficient updating can be performed. Moreover, the overlap degree volume updating unit 171 may update the overlap degree volume 191 on the basis of a state one time before in the time direction. By doing this, it is possible to suppress influence caused by overlapping of visual fields by chance at a certain moment in imaging orientation control, for example.

The overlap degree volume 191 latest obtained by updating as described above is supplied to the quality weight integration unit 132. Furthermore, the overlap degree volume 191 is also supplied to the subject determination unit 172.

The subject determination unit 172 performs subject determination that determines presence or absence of the subject by using the overlap degree volume 191. The subject determination unit 172 determines whether or not a target exists that allows viewing of a specific subject from various angles, and if the target exists, determines that the target exists with how many, which position, and what degree of regions. More specifically, the subject determination unit 172 performs segmentation in the volume by using region growing or the like from an overlap degree peak in the overlap degree volume, to specify the volume where the subject exists. The subject determination unit 172 repeats this to extract a subject region from the overlap degree volume, performs threshold processing with the overlap degree, the size of the region, or the like from the subject region, and sorts the subject according to the importance to obtain subject information 193. The subject determination unit 172 performs the subject determination for each voxel.

The subject information 193 may be any information as long as it is information indicating a result of the subject determination, but, for example, may be set to include a subject flag indicating the presence or absence of the subject (in other words, whether or not the subject is included in the voxel), the subject flag being set for each voxel in the three-dimensional region. That is, in this case, the subject determination unit 172 performs the subject determination for each voxel, sets the subject flag indicating the result, and includes the flag in the subject information 193.

Note that, the subject determination unit 172 may perform the subject determination using previous frame subject information 192. The subject information 193 obtained as described above is supplied to the quality weight integration unit 132.

Quality Weight Integration Unit

Figure 5:
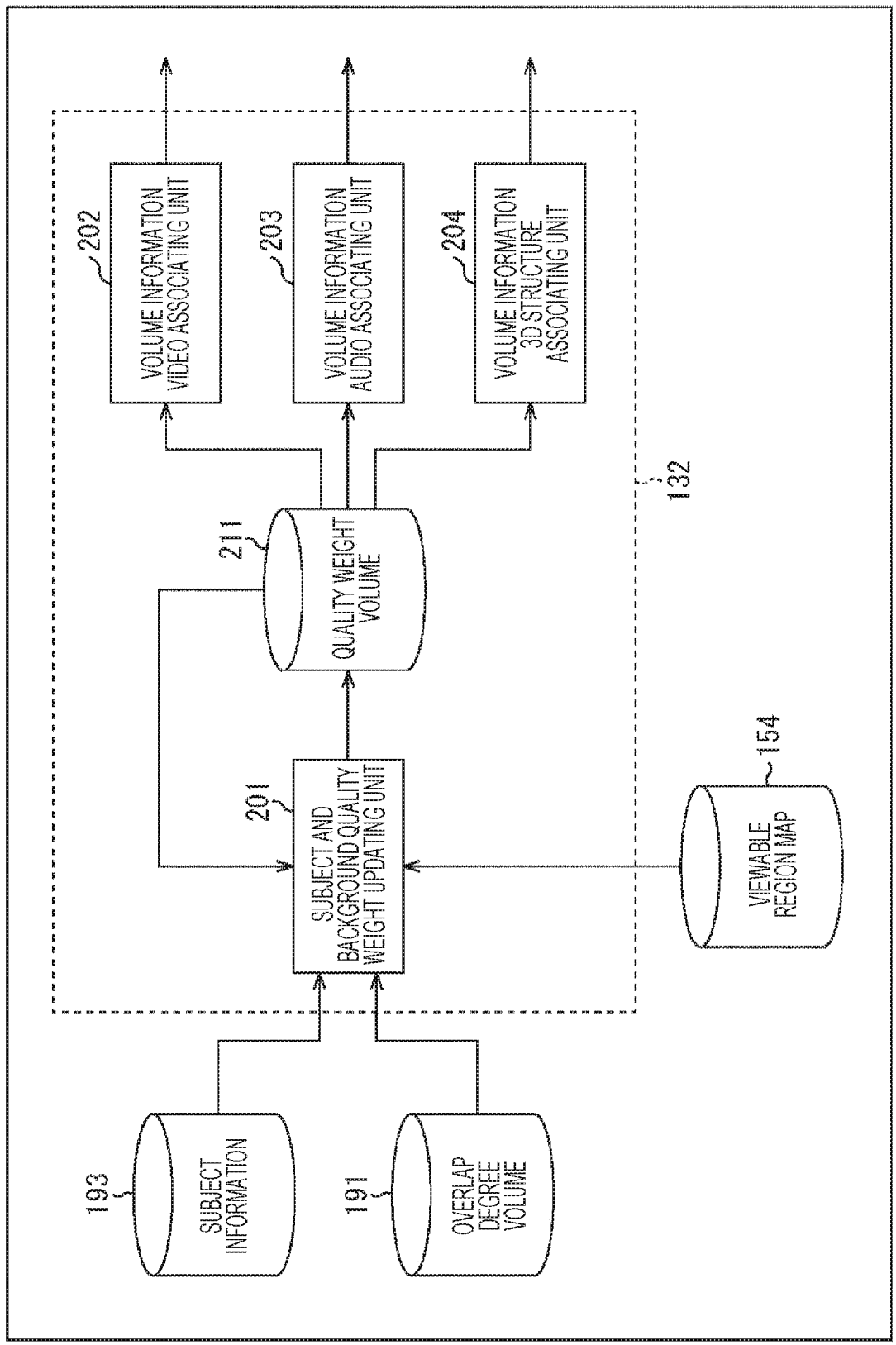
FIG. 5 is a block diagram illustrating a main configuration example of a quality weight integration unit.

FIG. 5 is a block diagram illustrating a main configuration example of the quality weight integration unit 132 of FIG. 3. As illustrated in FIG. 3, the quality weight integration unit 132 includes a subject and background quality weight updating unit 201, a volume information video associating unit 202, a volume information audio associating unit 203, and a volume information 3D structure associating unit 204.

By using the overlap degree volume 191 and the subject information 193 supplied from the visual field overlap degree calculating unit 131, and a viewable region map 154 set in advance by the photographer or the like, the subject and background quality weight updating unit 201 (also referred to as a weighting unit) performs weighting concerning the quality on the three-dimensional region to be imaged, and updates a quality weight volume 211.

The quality weight volume 211 is, for example, three-dimensional volume information in which a large value is saved for each aspect for a three-dimensional region to be left with high quality on the basis of the overlap degree volume 191. That is, the quality weight volume 211 is information indicating a distribution of a weight concerning the quality (also referred to as a quality weight) of the three-dimensional region to be imaged. For example, weighting concerning the quality may be performed for each voxel, and the quality weight volume 211 may include the quality weight of each voxel.

The subject information 193 provides information regarding an existence position and a region of the subject that should be left with high quality in particular. Furthermore, the viewable region map 154 indicates an unviewable three-dimensional position. The viewable region map 154 is expressed by volume information in which a flag of a value of 1 is set for a position (voxel) that can be included in the free viewpoint image in the three-dimensional region, for example. In other words, a voxel for which a flag of a value of 0 is set (or a voxel for which no flag is set) is a region that cannot be included in the free viewpoint image. As necessary, information may be allowed to be additionally written, such as information indicating that viewing is impossible only in a specific direction from each position. The viewable region map 154 can be used, for example, in a case where it is desired to exclude a historic site under restoration from a target of the free viewpoint image, among buildings of sightseeing spots. For an unviewable target region, processing is automatically performed in which quality is extremely low, the region is not saved, or the like at the time of quality weight calculation in the latter stage.

For example, a smaller quality weight (for example, a minimum value (for example, 0)) is set for a voxel with the flag of 0 of the viewable region map 154. Furthermore, a larger quality weight (for example, a maximum value) is set for a voxel with the flag of 1 of the viewable region map 154 and the subject flag of 1. Moreover, a quality weight of a voxel with the flag of 1 of the viewable region map 154 and the subject flag of 0 is set to a value of the voxel of the overlap degree volume 191. That is, for a voxel determined that the subject is included, a quality weight is set larger than a quality weight set for a voxel determined that the subject is not included. Note that, the viewable region map 154 may be omitted.

Figure 6:
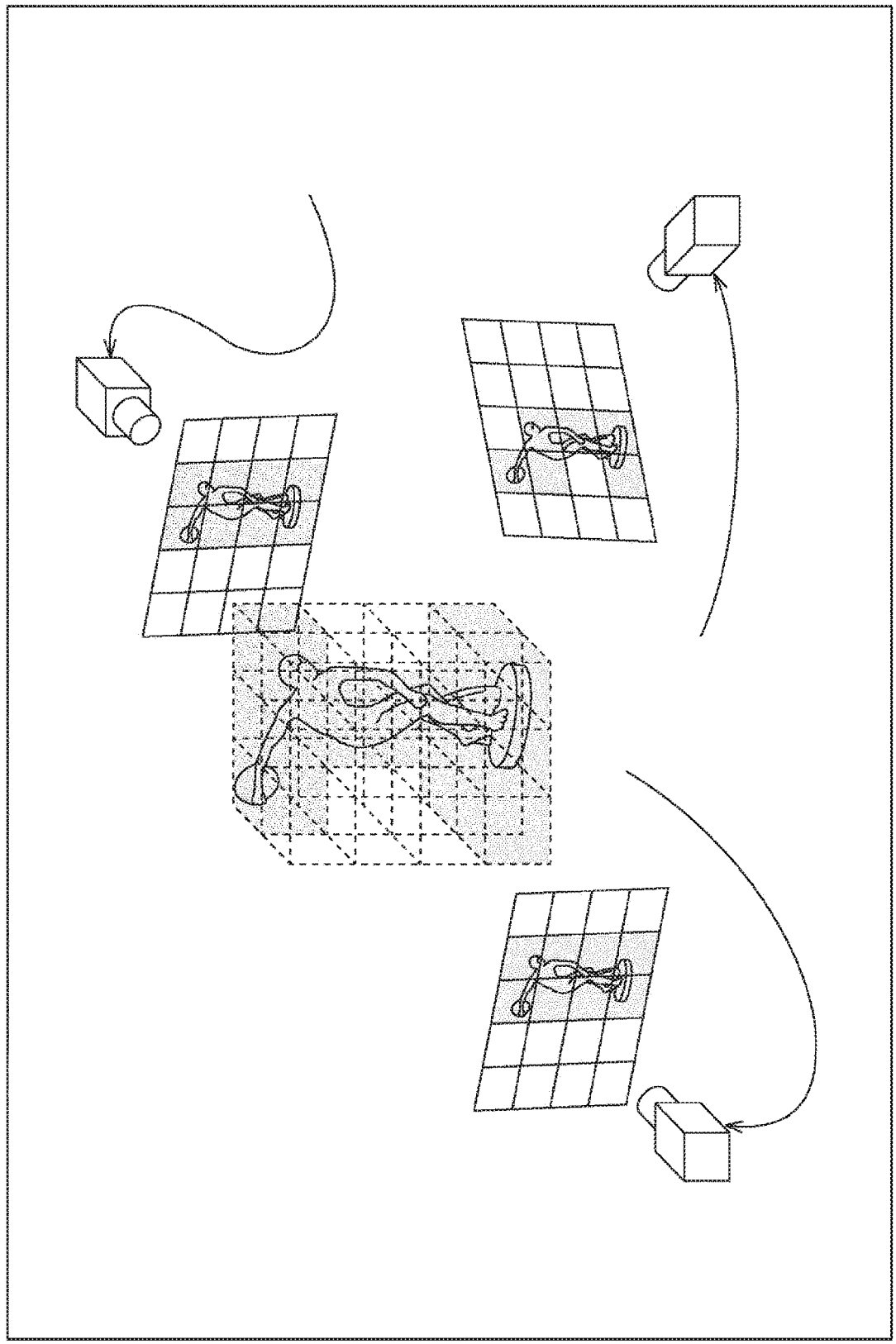
FIG. 6 is a diagram illustrating an example of a state of association of volume information.
Figure 7:
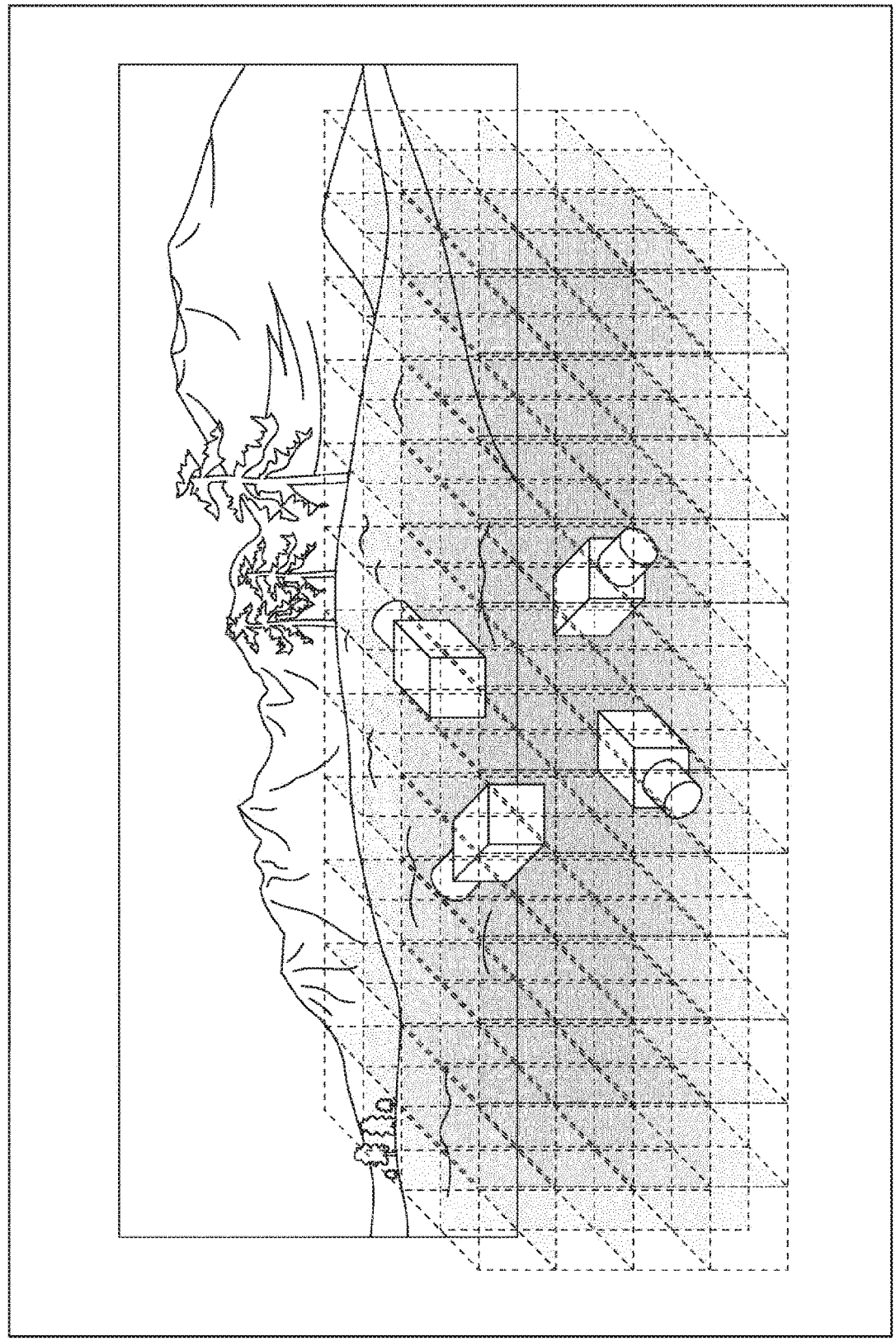
FIG. 7 is a diagram illustrating an example of a state of association of volume information.

Thereafter, the quality weight volume 211 is associated with each piece of information. The volume information video associating unit 202 (also referred to as a weight video associating unit) associates the quality weight volume 211 with the captured image. That is, the quality weight of each voxel is associated with a region corresponding to each voxel included in the captured image. That is, a projection is obtained how the quality weight volume 211 corresponds to each captured image. For example, FIG. 6 illustrates an example of a state of such association in a case where the subject exists. Furthermore, FIG. 7 illustrates an example of a state of such association in a case where the subject does not exist, for example. The volume information video associating unit 202 supplies image data (captured image data) associated with the quality weight volume 211 to the video encoding unit 133.

The volume information audio associating unit 203 (also referred to as a weight audio associating unit) associates the quality weight volume 211 with an audio signal (audio data). For example, the volume information audio associating unit 203 associates the quality weight with each voxel depending on position information and a direction of a sound collecting microphone. The volume information audio associating unit 203 supplies the audio data associated with the quality weight volume 211 to the audio encoding unit 134.

The volume information 3D structure associating unit 204 (also referred to as a weight three-dimensional structure associating unit) associates the quality weight volume 211 with 3D structure data representing a structure of the three-dimensional region to be imaged. For example, a position of the quality weight volume 211 is subjected to coordinate transformation, and is associated with the volume information 3D structure associating unit 204 as it is. The volume information 3D structure associating unit 204 supplies the 3D structure data associated with the quality weight volume 211 to the three-dimensional structure encoding unit 135.

On the basis of this correspondence, the video encoding unit 133 to the three-dimensional structure encoding unit 135 in FIG. 3 perform encoding control so that degradation of a region having a larger weight is reduced. For example, on the basis of the quality weight of each region, the video encoding unit 133 performs setting of a bit rate and determination of a coding mode for encoding of the image of the region. That is, the video encoding unit 133 performs encoding of the image of each region in the bit rate and the coding mode based on the quality weight of the region. Furthermore, for example, on the basis of the quality weight of each region, the audio encoding unit 134 performs setting of a bit rate and determination of a coding mode for encoding of the audio of the region. That is, the audio encoding unit 134 performs encoding of the audio of each region in the bit rate and the coding mode based on the quality weight of the region. Moreover, for example, on the basis of the quality weight, the three-dimensional structure encoding unit 135 sets an approximation and a reduction rate of the number of vertices expressing three dimensions.

Flow of Encoding Processing

Next, an example will be described of a flow of encoding processing executed by the encoding device 114 as described above with reference to a flowchart of FIG. 8.

When the encoding processing is started, in step S101, the visual field overlap degree calculating unit 131 of the encoding device 114 executes visual field overlap degree calculation processing, and updates the overlap degree volume 191 and the subject information 193. In step S102, the quality weight integration unit 132 executes quality weight integration processing, and updates the quality weight volume 211. In step S103, the video encoding unit 133 to the three-dimensional structure encoding unit 135 perform weighting encoding processing, and encode various types of information such as image data, audio data, and three-dimensional structure data with a method depending on the quality weight. Upon completion of the processing of step S103, the encoding processing is completed.

Flow of Visual Field Overlap Degree Calculation Processing

Figure 8:
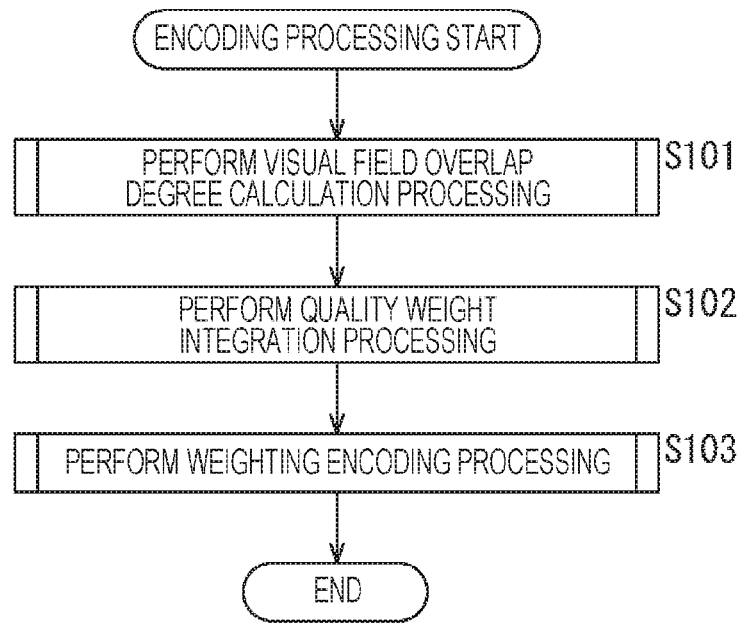
FIG. 8 is a flowchart describing an example of a flow of encoding processing.

Next, with reference to a flowchart of FIG. 9, an example will be described of a flow of the visual field overlap degree calculation processing executed in step S101 of FIG. 8. When the visual field overlap degree calculation processing is started, in step S121, the overlap degree volume updating unit 171 of the visual field overlap degree calculating unit 131 executes overlap degree volume update processing, and updates the overlap degree volume 191. In step S122, the subject determination unit 172 executes subject region detection processing, and detects the subject region that is a region in which the subject in the three-dimensional region exists. Upon completion of the processing of step S122, the visual field overlap degree calculation processing is completed, and the processing returns to FIG. 8.

Flow of Overlap Degree Volume Update Processing

Next, with reference to a flowchart of FIG. 10, an example will be described of a flow of the overlap degree volume update processing executed in step S121 of FIG. 9.

When the overlap degree volume update processing is started, in step S141, the overlap degree volume updating unit 171 initializes a variable i (for example, i=0). In step S142, the overlap degree volume updating unit 171 initializes a variable j (for example, j=0). In step S143, on the basis of the information such as the imaging position estimation information 151 and the imaging internal parameter 152, the overlap degree volume updating unit 171 estimates a position and an orientation of the i-th imaging device 111, in other words, an imaging range (view cone (visual field cone)) of the i-th imaging device 111. In step S144, the overlap degree volume updating unit 171 calculates a position of the j-th voxel.

In step S145, the overlap degree volume updating unit 171 determines whether or not the j-th voxel is positioned in the view cone of the i-th imaging device 111. In a case where it is determined that the voxel is positioned, the processing proceeds to step S146. In step S146, the overlap degree volume updating unit 171 updates a voxel value, in other words, a visual field overlap degree of the j-th voxel that is a processing target. Upon completion of the processing of step S146, the processing proceeds to step S147. Furthermore, in a case where it is determined in step S145 that the j-th voxel is not positioned in the view cone of the i-th imaging device 111, the processing of step S146 is omitted, and the processing proceeds to step S147.

In step S147, the overlap degree volume updating unit 171 determines whether or not an unprocessed voxel exists. In a case where it is determined that the voxel exists, the processing proceeds to step S148. In step S148, the overlap degree volume updating unit 171 increments (for example, +1) the variable j. In other words, a new voxel is set as a processing target. Upon completion of the processing of step S148, the processing returns to step S144, and the subsequent processing steps are repeated.

Then, in a case where it is determined in step S147 that all the voxels have been processed, the processing proceeds to step S149. In step S149, the overlap degree volume updating unit 171 determines whether or not an unprocessed imaging device 111 exists. In a case where it is determined that the imaging device exists, the processing proceeds to step S150. In step S150, the overlap degree volume updating unit 171 increments (for example, +1) the variable i. In other words, a new imaging device 111 is set as a processing target. Upon completion of the processing of step S150, the processing returns to step S142, and the subsequent processing steps are repeated.

Figure 9:
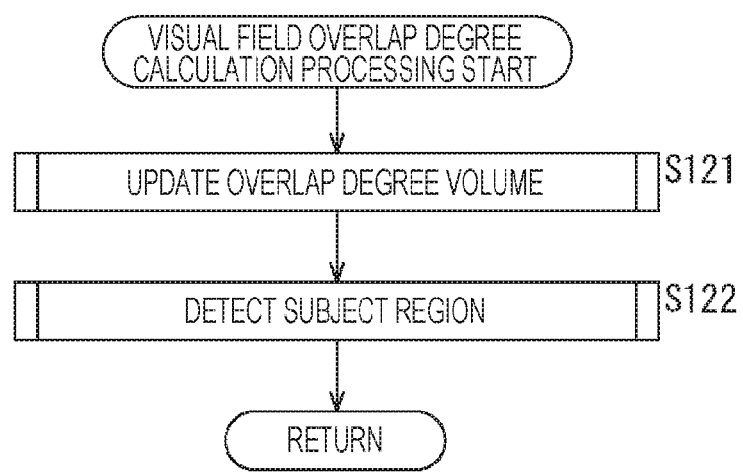
FIG. 9 is a flowchart describing an example of a flow of visual field overlap degree calculation processing.
Figure 10:
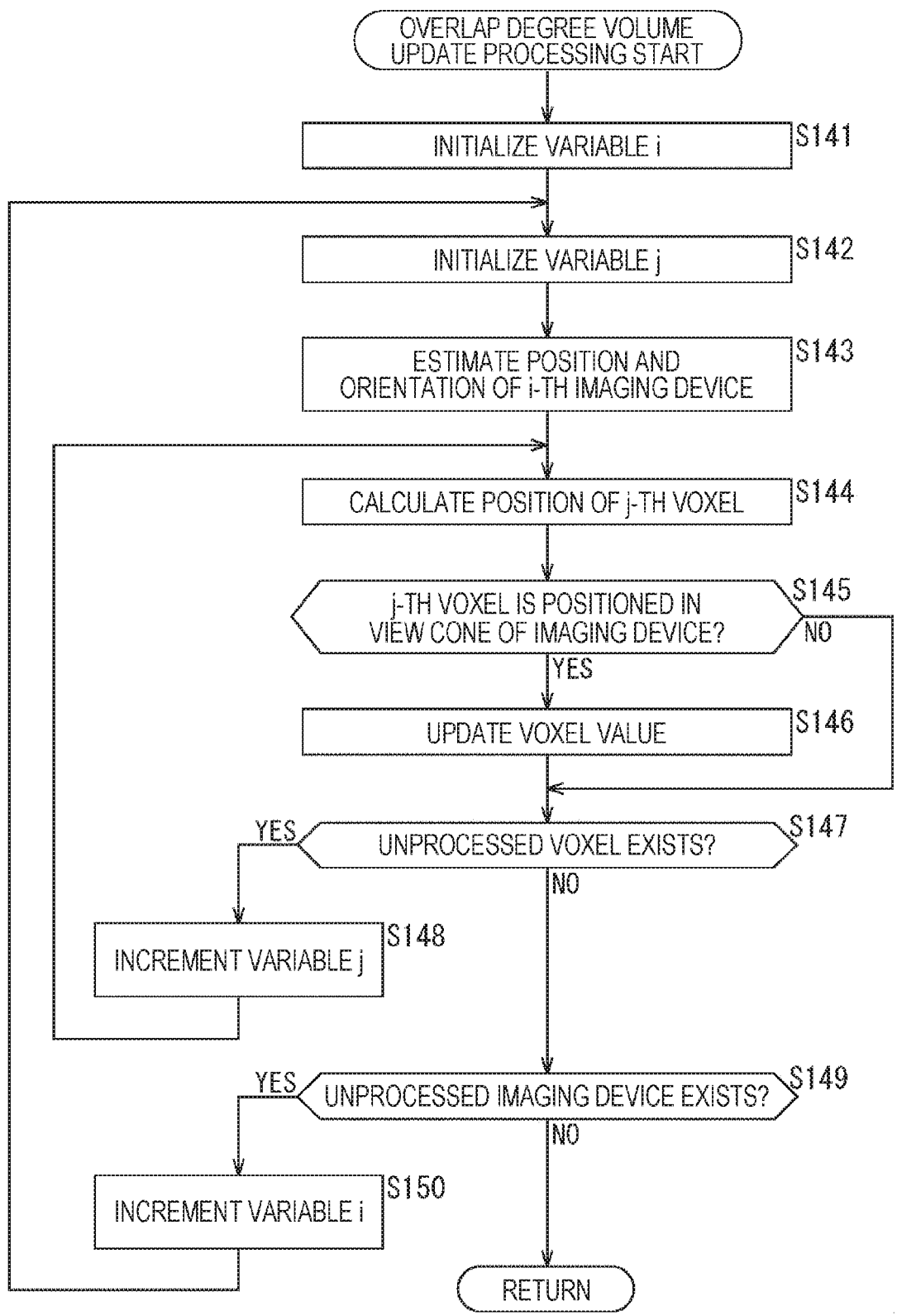
FIG. 10 is a flowchart describing an example of a flow of overlap degree volume update processing.

Then, in a case where it is determined in step S149 that all the imaging devices 111 have been processed, the overlap degree volume update processing is completed, and the processing returns to FIG. 9. That is, the imaging ranges of all the imaging devices 111 are compared with all the voxels, and a voxel positioned within the imaging range of any of the imaging devices 111 is retrieved. Then, the overlap degree volume of the voxel positioned within the imaging range of the any of the imaging devices 111 is updated.

Flow of Subject Region Detection Processing

Figure 11:
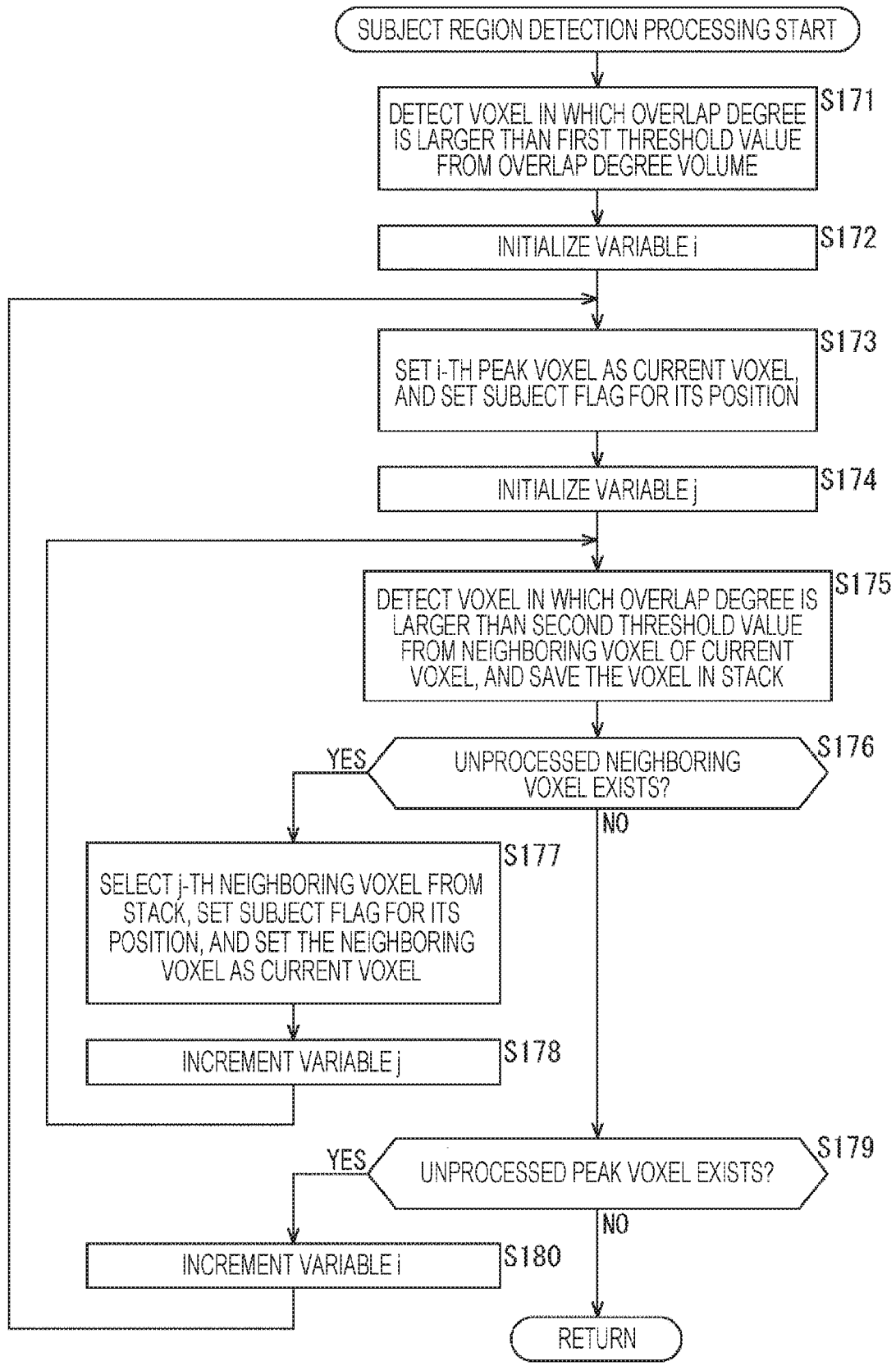
FIG. 11 is a flowchart describing an example of a flow of subject detection processing.

Next, with reference to a flowchart of FIG. 11, an example will be described of a flow of the subject region detection processing executed in step S122 of FIG. 9. When the subject region detection processing is started, in step S171, the subject determination unit 172 detects a voxel (also referred to as a peak voxel) in which the overlap degree is larger than a first threshold value from the overlap degree volume 191. In step S172, the subject determination unit 172 initializes the variable i. In step S173, the subject determination unit 172 sets the i-th peak voxel as a current voxel, and sets the subject flag for its position (for example, the subject flag=1). In step S174, the subject determination unit 172 initializes the variable j (for example, j=0). In step S175, the subject determination unit 172 detects a voxel in which the overlap degree is larger than a second threshold value smaller than the first threshold value from voxels (neighboring voxels) positioned in the vicinity of the current voxel, and saves the voxel in a stack.

In step S176, the subject determination unit 172 determines whether or not an unprocessed neighboring voxel exists in the stack. In a case where it is determined that the voxel exists, the processing proceeds to step S177. In step S177, the subject determination unit 172 selects the j-th neighboring voxel from the stack, sets the subject flag for its position, and sets the neighboring voxel as the current voxel. In step S178, the subject determination unit 172 increments (for example, +1) the variable j. In other words, the processing target is shifted to the next neighboring voxel. Upon completion of the processing of step S178, the processing returns to step S176, and the subsequent processing steps are repeated.

In a case where it is determined in step S176 that the unprocessed neighboring voxel does not exist, the processing proceeds to step S179. In step S179, the subject determination unit 172 determines whether or not an unprocessed peak voxel exists. In a case where it is determined that the voxel exists, the processing proceeds to step S180.

In step S180, the subject determination unit 172 increments (for example, +1) the variable i. In other words, the processing target is shifted to the next peak voxel. Upon completion of the processing of step S180, the processing returns to step S175, and the subsequent processing steps are repeated. Furthermore, in a case where it is determined in step S179 that all the peak voxels have been processed, the subject detection processing is completed, and the processing returns to FIG. 9.

Flow of Quality Weight Integration Processing

Figure 12:
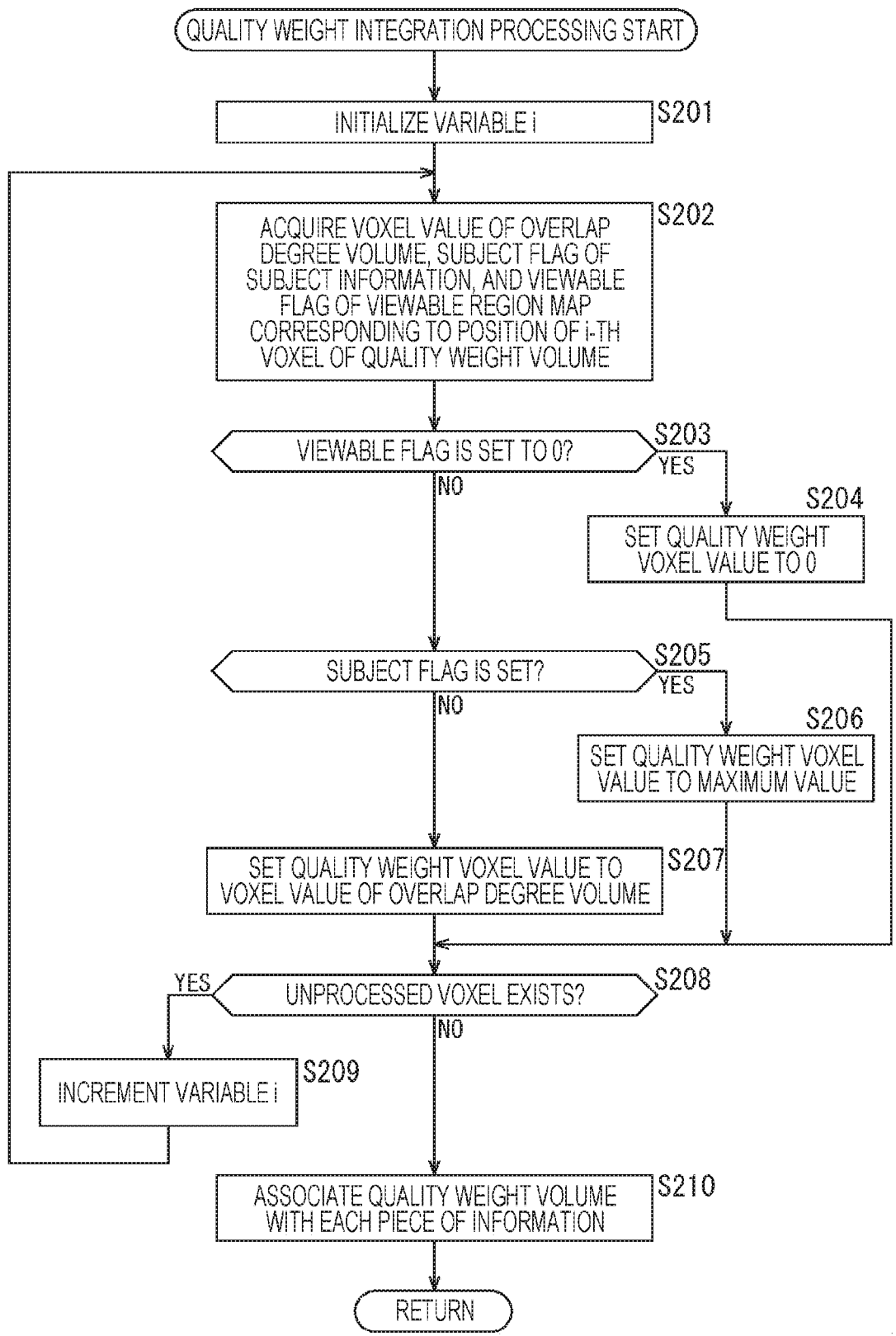
FIG. 12 is a flowchart describing an example of a flow of quality weight integration processing.

Next, with reference to a flowchart of FIG. 12, an example will be described of a flow of the quality weight integration processing executed in step S102 of FIG. 8.

When the quality weight integration processing is started, in step S201, the subject and background quality weight updating unit 201 initializes the variable i (for example, j=0). In step S202, the subject and background quality weight updating unit 201 acquires the voxel value of the overlap degree volume 191, the subject flag of the subject information 193, and a viewable flag of the viewable region map 154 corresponding to the position of the i-th voxel of the quality weight volume.

In step S203, the subject and background quality weight updating unit 201 determines whether or not the viewable flag is set to 0. In a case where it is determined that the viewable flag of the i-th voxel is set to 0, the processing proceeds to step S204. In step S204, the subject and background quality weight updating unit 201 sets the quality weight of the i-th voxel to 0 (or the minimum value). Upon completion of the processing of step S204, the processing proceeds to step S208. Furthermore, in a case where it is determined in step S203 that the viewable flag of the i-th voxel is set to 1, the processing proceeds to step S205.

In step S205, the subject and background quality weight updating unit 201 determines whether or not the subject flag is set (set to 1). In a case where it is determined that the subject flag of the i-th voxel is set (set to 1), the processing proceeds to step S206. In step S206, the subject and background quality weight updating unit 201 sets the quality weight of the i-th voxel to the maximum value. Upon completion of the processing of step S206, the processing proceeds to step S208. Furthermore, in a case where it is determined in step S205 that the subject flag of the i-th voxel is not set (set to 0), the processing proceeds to step S207.

In step S207, the subject and background quality weight updating unit 201 sets the quality weight of the i-th voxel to the visual field overlap degree of the i-th voxel of the overlap degree volume 191. Upon completion of the processing of step S207, the processing proceeds to step S208.

In step S208, the subject and background quality weight updating unit 201 determines whether or not an unprocessed voxel exists. In a case where it is determined that the voxel exists, the processing proceeds to step S209. In step S209, the subject and background quality weight updating unit 201 increments (for example, +1) the variable i. In other words, the processing target is shifted to the next voxel. Upon completion of the processing of step S209, the processing returns to step S202, and the subsequent processing steps are repeated.

Then, in a case where it is determined in step S208 that all the voxels have been processed, the processing proceeds to step S210. In step S210, the volume information video associating unit 202 to the volume information 3D structure associating unit 204 associate the quality weight volume 211 thus updated with various types of information such as image, audio, and 3D structure data. Upon completion of the processing of step S210, the quality weight integration processing is completed, and the processing returns to FIG. 8.

Flow of Weighting Encoding Processing

Figure 13:
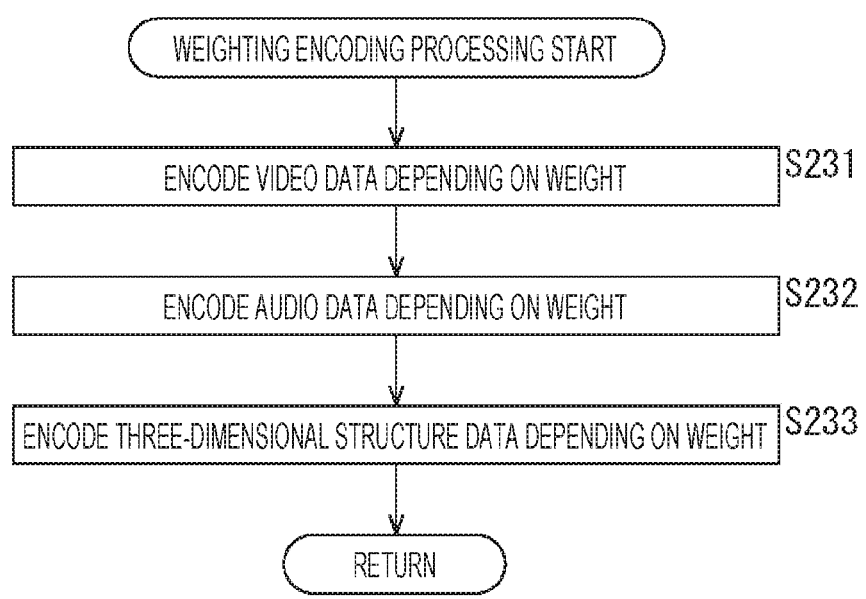
FIG. 13 is a flowchart describing an example of a flow of a weighting encoding processing.

Next, with reference to a flowchart of FIG. 13, an example will be described of a flow of the weighting encoding processing executed in step S103 of FIG. 8.

When the weighting encoding processing is started, in step S231, the video encoding unit 133 of the encoding device 114 encodes the video data with a method depending on the quality weight. In step S232, the audio encoding unit 134 encodes the audio data with a method depending on the quality weight. In step S233, the three-dimensional structure encoding unit 135 encodes the three-dimensional structure data with a method depending on the quality weight. Upon completion of the processing of step S233, the weighting encoding processing is completed, and the processing returns to FIG. 8.

By executing each piece of processing as described above, the encoding device 114 can encode the information regarding the three-dimensional region such as the video, audio, and three-dimensional structure, with a method depending on the quality weight of the three-dimensional region to be imaged, the quality weight being set on the basis of the visual field overlap degree. Therefore, since the compression ratio can be improved so that quality degradation is suppressed of the portion with the relatively high degree of interest (in other words, a portion relatively likely to be included in the free viewpoint image) compared to the portion with the relatively low degree of interest (in other words, a portion relatively difficult to be included in the free viewpoint image), the reduction in coding efficiency can be suppressed while the reduction in subjective quality is suppressed.

Furthermore, when the mode is simply switched between a state of "subject present" and a state of "no subject", there is a possibility that the quality rapidly changes at the time of state transition between the states, and the subjective quality is reduced; however, as described above, by using the value of the visual field overlap degree as the quality weight, saving is possible with more appropriate quality always continuously even if the subject is photographed at the edge of the captured image imaged by a single imaging device 111 in the middle of transition from the state of "subject present" state to the state of "no subject", for example.

Furthermore, on the contrary, in a case where the subject is still a little distant and far from the camera group in transition from the state of "no subject" to the state of "subject present", for example, the quality weight is low, and the quality weight increases gradually and continuously when the subject becomes close to the camera group and comes to be seen from various directions, whereby efficient and subjectively excellent quality control can be performed.

Note that, information such as the overlap degree volume 191 and the quality weight volume 211 may be added to the content (coded data) as metadata. By doing this, it is possible to refer to the metadata later, and use the information for a highlight, thumbnail creation using the highlight, and the like, for example. Furthermore, for example, the information can be used for detecting an unnecessary video transition section at the time of editing. Of course, it is possible to add, to the content (coded data) as metadata, the arbitrary information described above other than the overlap degree volume 191 and the quality weight volume 211, for example, the imaging position estimation information 151, the imaging internal parameter 152, the depth information 153, the viewable region map 154, the subject information 193, or the like.

3. Second Embodiment

Imaging Storage System

Figure 14:
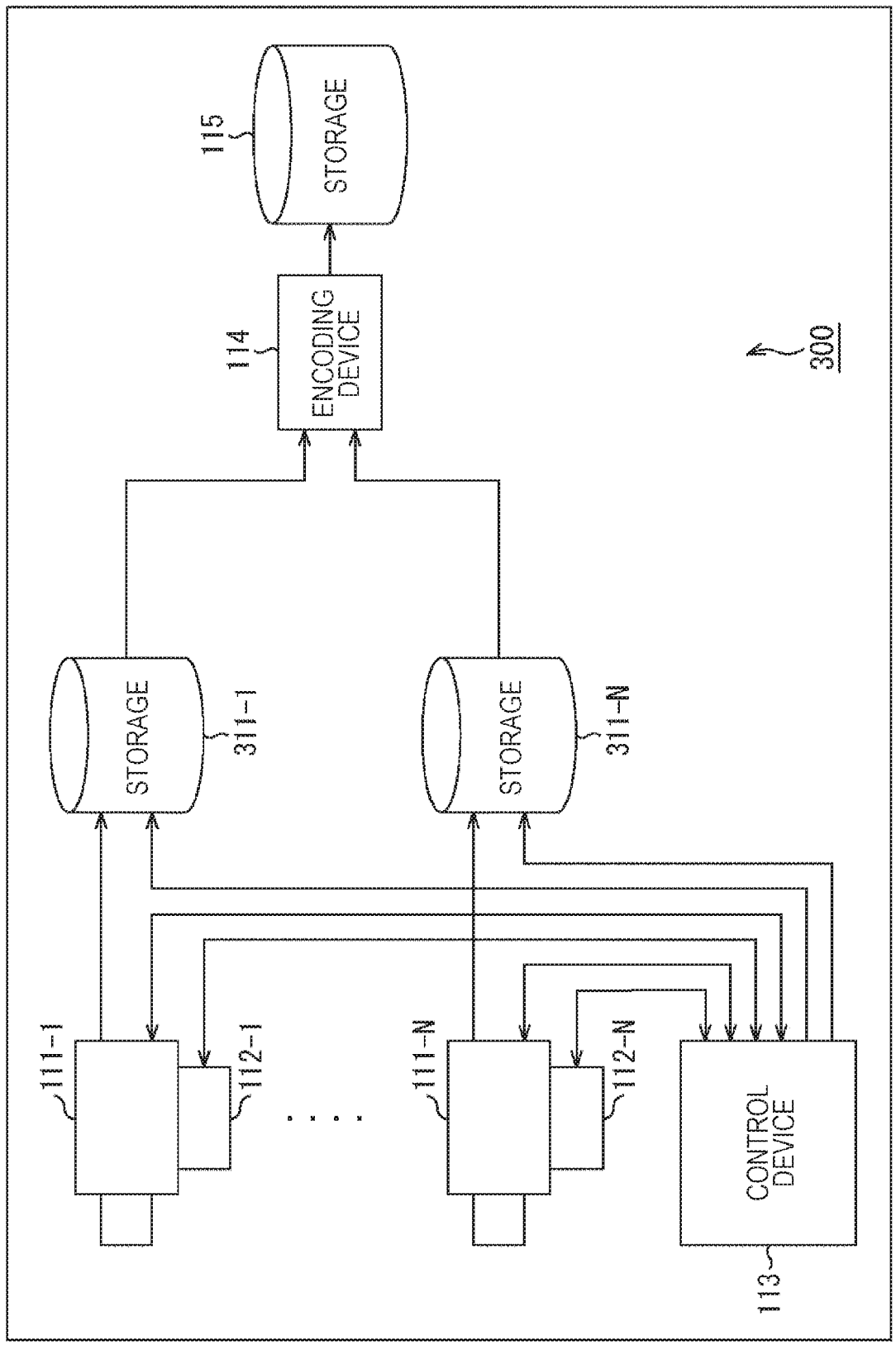
FIG. 14 is a diagram illustrating a main configuration example of an imaging storage system.

FIG. 14 is a block diagram illustrating a main configuration example of an imaging storage system that is an embodiment of the information processing system to which the present technology is applied. An imaging storage system 300 illustrated in FIG. 14 is a system similar to the imaging storage system 100 of FIG. 2, basically has a similar configuration, and performs similar processing. However, the imaging storage system 300 includes storages 311-1 to 311-N (N is a natural number). Hereinafter, in a case where it is not necessary to distinguish and describe the storages 311-1 to 311-N from each other, each storage is also referred to as a storage 311.

The storage 311 includes an arbitrary storage medium, for example, a hard disk or a semiconductor memory, and stores information. The storage 311 is provided to correspond to each imaging device 111, and stores and saves information (for example, image data, audio data, and the like) obtained by the imaging device 111 corresponding to the storage 311. For example, the storage 311-1 stores image data, audio data, and the like of a captured image obtained by imaging by the imaging device 111-1. Similarly, the storage 311-N stores image data, audio data, and the like of a captured image obtained by imaging by the imaging device 111-N.

In the case of the imaging storage system 300, unlike the case of the imaging storage system 100, the encoding device 114 acquires the image data, audio data, and the like from the storage 311. That is, such a storage 311 is provided and the information obtained by the imaging device 111 is temporarily stored in the storage 311, whereby the encoding device 114 does not have to instantaneously encode the information obtained by the imaging device 111, and can perform encoding at an arbitrary timing.

Also in this case, the encoding device 114 can perform encoding with a method similar to that described in the first embodiment. In other words, the reduction in coding efficiency can be suppressed while the reduction in subjective quality is suppressed.

Note that, if pieces of information obtained respectively in the plurality of imaging devices 111 can be managed independently of each other, one storage 311 may store the pieces of information obtained by the plurality of imaging devices 111. That is, the number of storages 311 is arbitrary, and may be the same as the number of imaging devices 111, or may be smaller or larger than the number of imaging devices 111.

4. Third Embodiment

Imaging Transmission System

Figure 15:
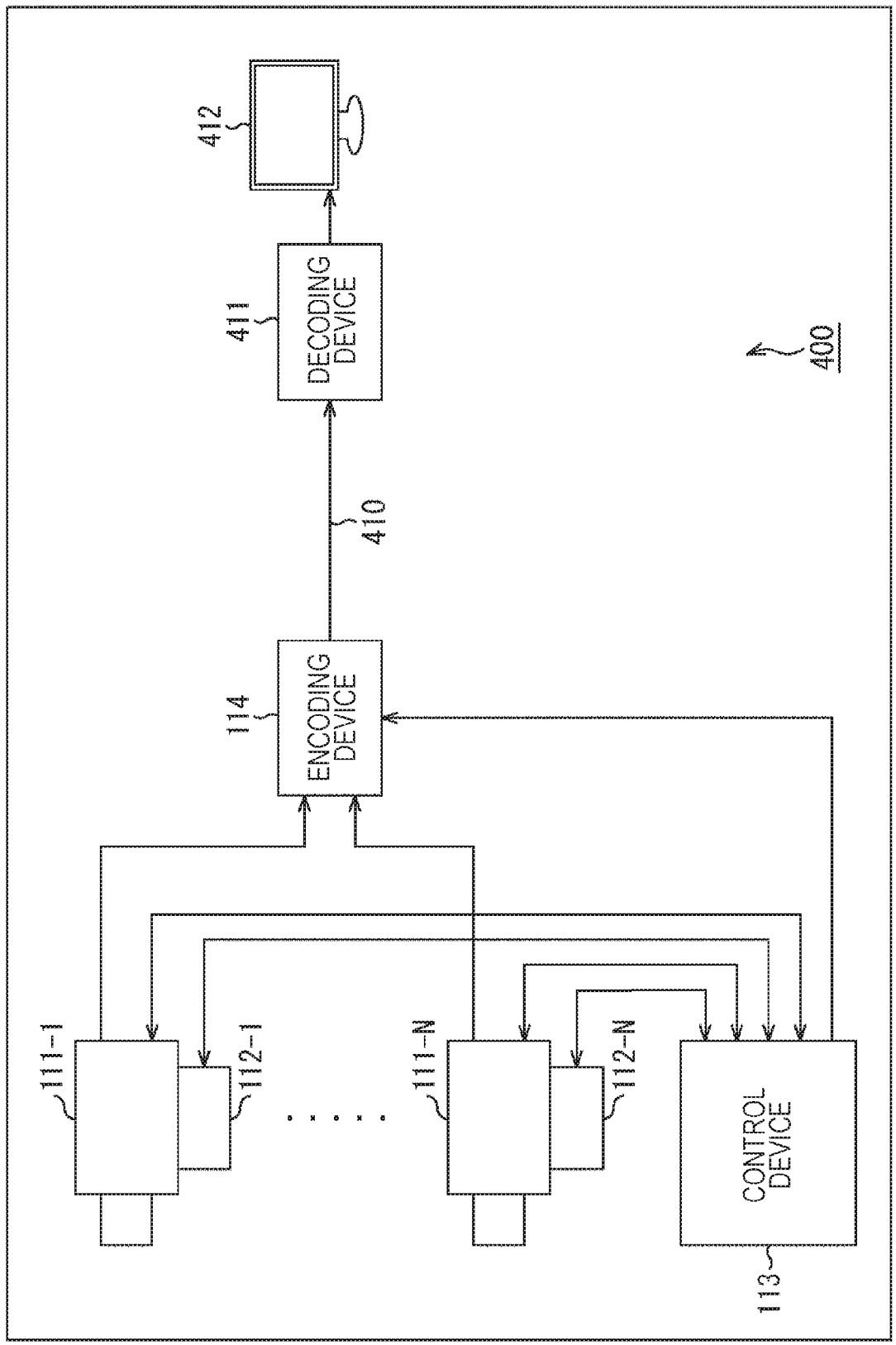
FIG. 15 is a diagram illustrating a main configuration example of an imaging transmission system.

Furthermore, the coded data obtained by encoding by the encoding device 114 may be transmitted to another device without being stored in the storage 115. FIG. 15 is a block diagram illustrating a main configuration example of an imaging transmission system that is an embodiment of the information processing system to which the present technology is applied. An imaging transmission system 400 illustrated in FIG. 15 is a system similar to the imaging storage system 100 of FIG. 2, basically has a similar configuration, and performs similar processing. However, the imaging transmission system 400 includes a communication medium 410, a decoding device 411, and a monitor 412, instead of the storage 115.

The communication medium 410 is a transmission medium used for exchanging information between the encoding device 114 and the decoding device 411. That is, communication between the encoding device 114 and the decoding device 411 is performed via the communication medium 410. Note that, the communication medium 410 may be of any type, for example, may include a wired cable (communication medium of wired communication), may include air (communication medium of wireless communication), or may include both of the wired cable and the air. For example, the communication medium 410 may include a communications network such as the Internet.

The decoding device 411 is a device that decodes the coded data generated by the encoding device 114 with a method corresponding to the encoding method in the encoding device 114. The decoding device 411 acquires the coded data generated by the encoding device 114 via the communication medium 410. The decoding device 411 decodes the obtained coded data with a decoding method corresponding to the encoding method in the encoding device 114. The decoding device 411 acquires image data and the like of the captured image by this decoding, for example. The decoding device 411 generates a free viewpoint image from the captured image and displays the image on the monitor 412 that is a display device.

Even in such a case, the encoding device 114 can perform encoding with a method similar to that described in the first embodiment. In other words, the reduction in coding efficiency can be suppressed while the reduction in subjective quality is suppressed.

5. Fourth Embodiment

Computer

A series of the processing steps described above can be executed by hardware, and can be executed by software. In a case where the series of processing steps is executed by software, a program constituting the software is installed in a computer. Here, the computer includes a computer incorporated in dedicated hardware, and a general purpose personal computer or the like capable of executing various functions by installation of various programs, for example.

Figure 16:
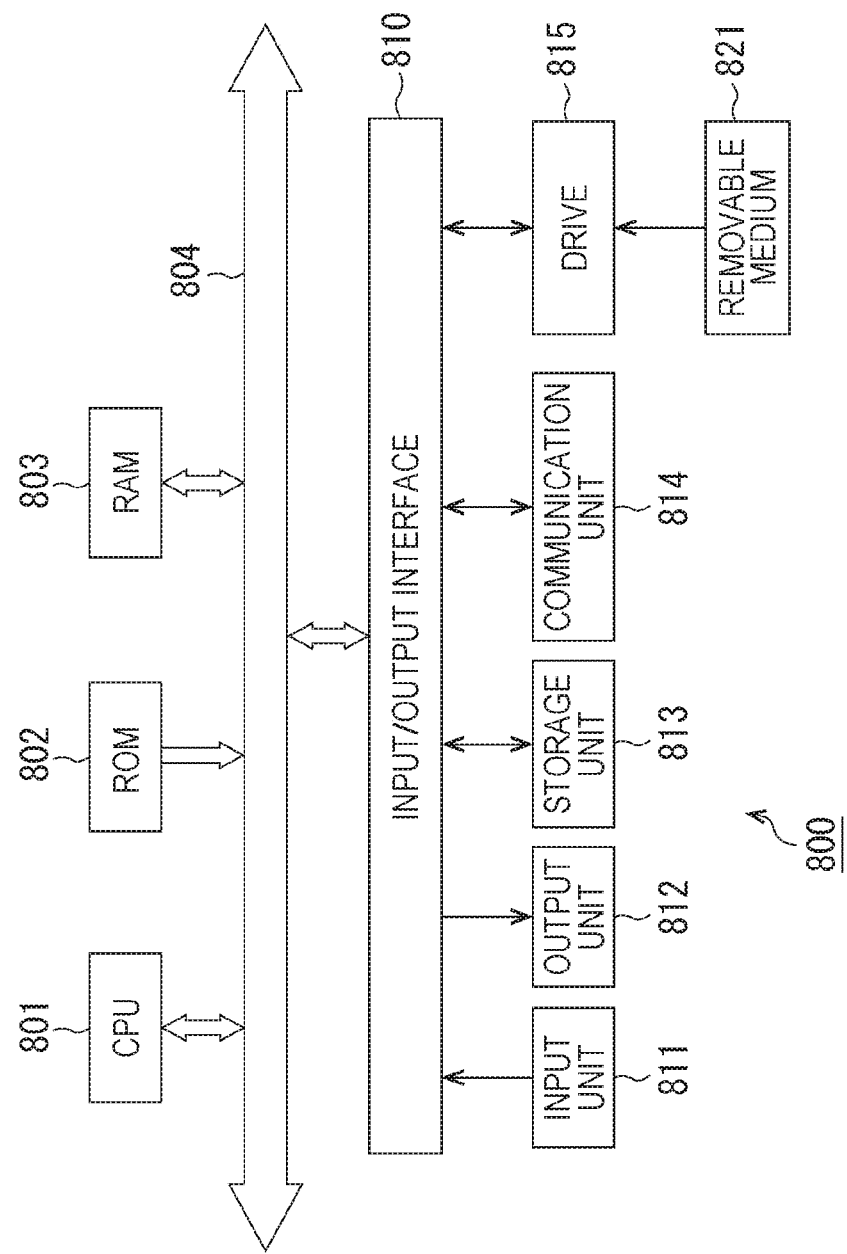
FIG. 16 is a block diagram illustrating a main configuration example of a computer.

FIG. 16 is a block diagram illustrating a configuration example of hardware of the computer that executes the series of processing steps described above by the program.

In a computer 800 illustrated in FIG. 16, a central processing unit (CPU) 801, read only memory (ROM) 802, and random access memory (RAM) 803 are connected to each other via a bus 804.

The bus 804 is also connected to an input/output interface 810. The input/output interface 810 is connected to an input unit 811, an output unit 812, a storage unit 813, a communication unit 814, and a drive 815.

The input unit 811 includes, for example, a keyboard, a mouse, a microphone, a touch panel, an input terminal, and the like. The output unit 812 includes, for example, a display, a speaker, an output terminal, and the like. The storage unit 813 includes, for example, a hard disk, a RAM disk, a nonvolatile memory, and the like. The communication unit 814 includes, for example, a network interface. The drive 815 drives a removable medium 821 such as a magnetic disk, an optical disk, a magneto-optical disk, or a semiconductor memory.

In the computer 800 configured as described above, for example, the CPU 801 loads the program stored in the storage unit 813 to the RAM 803 via the input/output interface 810 and the bus 804 to execute the series of the processing steps described above. In the RAM 803, data necessary for the CPU 801 to execute the various types of processing or the like is also stored appropriately.

The program executed by the computer 800 can be applied, for example, by being recorded in the removable medium 821 as a package medium or the like. In that case, the program can be installed to the storage unit 813 via the input/output interface 810 by mounting the removable medium 821 to the drive 815. Furthermore, the program can also be provided via a wired or wireless transmission medium such as a local area network, the Internet, or digital satellite broadcasting. In that case, the program can be received by the communication unit 814 and installed in the storage unit 813. Besides, the program can be installed in advance to the ROM 802, the storage unit 813, and the like.

6. Others

The embodiment of the present technology is not limited to the embodiments described above, and various modifications are possible without departing from the gist of the present technology.

For example, herein, a system means an aggregation of a plurality of constituents (device, module (component), and the like), and it does not matter whether or not all of the constituents are in the same cabinet. Thus, a plurality of devices that is accommodated in a separate cabinet and connected to each other via a network and one device that accommodates a plurality of modules in one cabinet are both systems.

Furthermore, for example, the configuration described as one device (or processing unit) may be divided and configured as a plurality of devices (or processing units). On the contrary, configurations described as a plurality of devices (or processing units) in the above may be collectively configured as one device (or processing unit). Furthermore, configurations other than those described above may be added to the configuration of each device (or each processing unit), of course. Moreover, as long as the configuration and operation of the system as a whole are substantially the same, a part of the configuration of a certain device (or processing unit) may be included in the configuration of another device (or another processing unit).

Furthermore, for example, the present technology can adopt a configuration of cloud computing that shares one function in a plurality of devices via a network to process in cooperation.

Furthermore, for example, the program described above can be executed in an arbitrary device. In that case, it is sufficient that the device has a necessary function (function block, or the like) and can obtain necessary information.

Furthermore, for example, each step described in the above flowchart can be executed by sharing in a plurality of devices, other than being executed by one device. Moreover, in a case where a plurality of pieces of processing is included in one step, the plurality of pieces of processing included in the one step can be executed by sharing in a plurality of devices, other than being executed by one device. In other words, a plurality of pieces of processing included in one step can be executed as processing of a plurality of steps. Conversely, processing described as a plurality of steps can be executed collectively as one step.

Note that, in the program executed by the computer, pieces of processing of steps describing the program may be executed in chronological order along with the order described in this specification, or in parallel, or may be individually executed at necessary timing such as when each step is called. That is, as long as inconsistency does not occur, the processing of each step may be executed in an order different from the order described above. Moreover, the processing of the step describing the program may be executed in parallel with processing of another program, or may be executed in combination with the processing of the other program.

Furthermore, the processing of each step described above can be executed in each device described above, or an arbitrary device other than the devices described above. In that case, it is sufficient that the device that executes the processing has a function (function block, or the like) necessary for executing the processing described above. Furthermore, it is sufficient that information necessary for the processing is transmitted to the device as appropriate.

Note that, as long as inconsistency does not occur, each of a plurality of the present technologies described in this specification can be implemented alone independently. Of course, it is also possible to implement by combining any of the plurality of present technologies. For example, a part or all of the present technology described in any of the embodiments can be implemented in combination with a part or all of the present technology described in other embodiments. Furthermore, a part or all of the present technology described above can be implemented in combination with another technology not described above.

Note that, the present technology can also be configured as described below.

(1) An information processing device including
an encoding unit that encodes information regarding a three-dimensional region on the basis of a distribution related to overlapping of visual fields of the three-dimensional region to be imaged by a plurality of imaging units, the distribution being specified by using a parameter relating to overlapping of visual fields that are imaging ranges of the plurality of imaging units.

(2) The information processing device according to (1), in which
the encoding unit further includes a weighting unit that performs weighting of the three-dimensional region by using the parameter.

(3) The information processing device according to (2), in which
the weighting unit individually performs weighting of a voxel that is a unit region of a predetermined size.

(4) The information processing device according to (3), in which
the weighting unit sets a larger weight for a voxel including a subject.

(5) The information processing device according to (3), further including
a subject determination unit that determines whether or not a subject is included, for each voxel, on the basis of the parameter, in which
the weighting unit is configured to set a larger weight for a voxel determined by the subject determination unit that the subject is included, than for a voxel determined by the subject determination unit that the subject is not included.

(6) The information processing device according to (5), in which
the subject determination unit detects a peak voxel in which the parameter is larger than a first threshold value, detects and holds a voxel in which the parameter is larger than a second threshold value smaller than the first threshold value in a periphery of the peak voxel detected, and determines that the peak voxel and the voxel in the periphery held include the subject.

(7) The information processing device according to any of (3) to (6), in which
the weighting unit sets a smaller weight for an unviewable voxel in the three-dimensional region.

(8) The information processing device according to (7), in which
the weighting unit sets a smaller weight for the unviewable voxel specified on the basis of a viewable region map indicating a distribution of a viewable region in the three-dimensional region.

(9) The information processing device according to any of (3) to (8), further including
a parameter calculating unit that calculates the parameter for each voxel, in which
the weighting unit is configured to perform weighting of the three-dimensional region by using the parameter calculated by the parameter calculating unit.

(10) The information processing device according to (9), in which
the parameter calculating unit calculates the parameter for each voxel on the basis of a position, a direction, a size, and a shape of a visual field cone indicating the imaging range of each of the imaging units.

(11) The information processing device according to (10), in which
the parameter calculating unit calculates the parameter further on the basis of a position in the visual field cone of each voxel.

(12) The information processing device according to (10) or (11), in which
the parameter calculating unit estimates the visual field cone on the basis of a position and an orientation of each of the imaging units.

(13) The information processing device according to (12), in which
the parameter calculating unit estimates the visual field cone further on the basis of an internal parameter of each of the imaging units.

(14) The information processing device according to (12) or (13), in which
the parameter calculating unit estimates the visual field cone further on the basis of depth information.

(15) The information processing device according to any of (2) to (14), further including
a weight video associating unit that associates a distribution of a weight in the three-dimensional region obtained by the weighting unit with a captured image of the three-dimensional region, in which
the encoding unit is configured to encode the captured image on the basis of the distribution of the weight in the three-dimensional region associated with the captured image by the weight video associating unit.

(16) The information processing device according to (15), in which
the encoding unit controls a bit rate or a coding mode of encoding of the captured image depending on the distribution of the weight in the three-dimensional region.

(17) The information processing device according to any of (2) to (16), further including
a weight audio associating unit that associates a distribution of a weight in the three-dimensional region obtained by the weighting unit with audio in the three-dimensional region, in which
the encoding unit is configured to encode the audio on the basis of the distribution of the weight in the three-dimensional region associated with the audio by the weight audio associating unit.

(18) The information processing device according to (17), in which
the encoding unit controls a bit rate or a coding mode of encoding of the audio depending on the distribution of the weight in the three-dimensional region.

(19) The information processing device according to any of (2) to (18), further including
a weight three-dimensional structure associating unit that associates a distribution of a weight in the three-dimensional region obtained by the weighting unit with three-dimensional structure data indicating a three-dimensional structure of the three-dimensional region, in which
the encoding unit is configured to encode the three-dimensional structure data on the basis of the distribution of the weight in the three-dimensional region associated with the three-dimensional structure data by the weight three-dimensional structure associating unit.

(20) The information processing device according to (19), in which
the encoding unit controls an approximation and a deletion rate of the number of vertices expressing three dimensions, of encoding of the three-dimensional structure data, depending on the distribution of the weight in the three-dimensional region.

(21) An information processing method including
encoding information regarding a three-dimensional region on the basis of a distribution related to overlapping of visual fields of the three-dimensional region to be imaged by a plurality of imaging units, the distribution being specified by using a parameter relating to overlapping of visual fields that are imaging ranges of the plurality of imaging units.

REFERENCE SIGNS LIST

100 Imaging storage system
111 Imaging device
112 Orientation control device
113 Control device
114 Encoding device
115 Storage
131 Visual field overlap degree calculating unit
132 Quality weight integration unit
133 Video encoding unit
134 Audio encoding unit
135 Three-dimensional structure encoding unit
136 Output unit
171 Overlap degree volume updating unit
172 Subject determination unit
201 Subject and background quality weight updating unit
202 Volume information video associating unit
203 Volume information audio associating unit
204 Volume information 3D structure associating unit
300 Imaging storage system
311 Storage
400 Imaging transmission system
410 Communication medium
411 Decoding device
412 Monitor
800 Computer

The invention claimed is:

1. An information processing device, comprising:
a central processing unit (CPU) configured to:
acquire information regarding a three-dimensional region imaged by a plurality of imaging units;
weight each voxel of a plurality of voxels in the three-dimensional region based on a parameter associated with an overlap of visual fields of the three-dimensional region, wherein
the visual fields of the three-dimensional region correspond to imaging ranges of the plurality of imaging units, and
each voxel of the plurality of voxels is a unit region of a specific size;
determine, based on the parameter, one of a presence or an absence of a subject in each voxel of the plurality of voxels;
set a first weight for a first voxel of the plurality of voxels in which the subject is present;
set a second weight for a second voxel of the plurality of voxels in which the subject is absent,
wherein the first weight is larger than the second weight; and
encode the information regarding the three-dimensional region based on the first weight, the second weight, and a distribution related to the overlap of the visual fields,
wherein the distribution related to the overlap of the visual fields is based on the parameter.

2. The information processing device according to claim 1, wherein the CPU is further configured to set a maximum weight for the first voxel including the subject.

3. The information processing device according to claim 1, wherein the CPU is further configured to:
detect a peak voxel of the plurality of voxels in which the parameter is larger than a first threshold value;
detect and hold a third voxel of the plurality of voxels in which the parameter is larger than a second threshold value, wherein
the second threshold value is smaller than the first threshold value, and
the detected third voxel is in a periphery of the detected peak voxel; and
determine that the detected peak voxel and the detected third voxel include the subject.

4. The information processing device according to claim 1, wherein the CPU is further configured to set a minimum weight for an unviewable voxel of the plurality of voxels in the three-dimensional region.

5. The information processing device according to claim 4, wherein
the CPU is further configured to set the minimum weight for the unviewable voxel based on a viewable region map, and
the viewable region map indicates a distribution of viewable regions in the three-dimensional region.

6. The information processing device according to claim 1, wherein the CPU is further configured to calculate the parameter for each voxel of the plurality of voxels.

7. The information processing device according to claim 6, wherein
the CPU is further configured to calculate the parameter for each voxel of the plurality of voxels based on a position, a direction, a size, and a shape of a visual field cone, and
the visual field cone indicates an imaging range of each imaging unit of the plurality of imaging units.

8. The information processing device according to claim 7, wherein the CPU is further configured to calculate the parameter based on a position of each voxel of the plurality of voxels in the visual field cone.

9. The information processing device according to claim 7, wherein the CPU is further configured to estimate the visual field cone based on a position and an orientation of each imaging unit of the plurality of imaging units.

10. The information processing device according to claim 9, wherein the CPU is further configured to estimate the visual field cone based on an internal parameter of each imaging unit of the plurality of imaging units.

11. The information processing device according to claim 9, wherein the CPU is further configured to estimate the visual field cone based on depth information.

12. The information processing device according to claim 1, wherein the CPU is further configured to:
associate a distribution of weights in the three-dimensional region with a captured image of the three-dimensional region; and
encode the captured image based on the association of the distribution of the weights in the three-dimensional region with the captured image.

13. The information processing device according to claim 12, wherein the CPU is further configured to control, based on the distribution of the weights in the three-dimensional region, at least one of a bit rate or a coding mode of the encode of the captured image.

14. The information processing device according to claim 1, wherein the CPU is further configured to:
associate a distribution of weights in the three-dimensional region with an audio in the three-dimensional region; and
encode the audio based on the association of the distribution of the weights in the three-dimensional region with the audio.

15. The information processing device according to claim 14, wherein the CPU is further configured to control, based on the distribution of the weights in the three-dimensional region, at least one of a bit rate or a coding mode of the encode of the audio.

16. The information processing device according to claim 1, wherein the CPU is further configured to:
associate a distribution of weights in the three-dimensional region with three-dimensional structure data, wherein the three-dimensional structure data indicates a three-dimensional structure of the three-dimensional region; and
encode the three-dimensional structure data based on the association of the distribution of the weights in the three-dimensional region with the three-dimensional structure data.

17. The information processing device according to claim 16, wherein
the CPU is further configured to control, based on the distribution of the weights in the three-dimensional region, an approximation and a deletion rate of a number of vertices expressing three dimensions, and
the approximation and the deletion rate correspond to the encode of the three-dimensional structure data.

18. An information processing method, comprising:
acquiring information regarding a three-dimensional region on imaged by a plurality of imaging units;
weighting each voxel of a plurality of voxels in the three-dimensional region based on a parameter associated with overlapping of visual fields of the three-dimensional region, wherein
the visual fields of the three-dimensional region correspond to imaging ranges of the plurality of imaging units, and
each voxel of the plurality of voxels is a unit region of a specific size;
determining, based on the parameter, one of a presence or an absence of a subject in each voxel of the plurality of voxels;
setting a first weight for a first voxel of the plurality of voxels in which the subject is present;
setting a second weight for a second voxel of the plurality of voxels in which the subject is absent,
wherein the first weight is larger than the second weight; and
encoding the information regarding the three-dimensional region based on the first weight, the second weight, and a distribution related to the overlapping of the visual fields,
wherein the distribution related to the overlapping of the visual fields is based on the parameter.

19. An information processing device, comprising:
a central processing unit (CPU) configured to:
acquire information regarding a three-dimensional region imaged by a plurality of imaging units;
calculate a parameter for each voxel of a plurality of voxels in the three-dimensional region based on a position, a direction, a size, and a shape of a visual field cone, wherein
the visual field cone indicates an imaging range of each imaging unit of the plurality of imaging units,
the calculated parameter is associated with an overlap of visual fields of the three-dimensional region, and
each voxel of the plurality of voxels is a unit region of a specific size;
weight each voxel of the plurality of voxels in the three-dimensional region based on the calculated parameter; and
encode the information regarding the three-dimensional region based on the weight of each voxel of the plurality of voxels and a distribution related to the overlap of the visual fields,
wherein the distribution related to the overlap of the visual fields is based on the parameter.

* * * * *